(12) United States Patent
Widmer et al.

(10) Patent No.: US 11,571,976 B2
(45) Date of Patent: Feb. 7, 2023

(54) FOREIGN OBJECT DETECTION USING HEAT SENSITIVE MATERIAL AND INDUCTIVE SENSING

(71) Applicant: WiTricity Corporation, Watertown, MA (US)

(72) Inventors: Hans Peter Widmer, Wohlenschwil (CH); Lukas Sieber, Olten (CH); Markus Bittner, Sarmenstorf (CH)

(73) Assignee: WiTricity Corporation, Watertown, MA (US)

( * ) Notice: Subject to any disclaimer, the term of this patent is extended or adjusted under 35 U.S.C. 154(b) by 17 days.

(21) Appl. No.: 17/153,235

(22) Filed: Jan. 20, 2021

(65) Prior Publication Data

US 2021/0138918 A1    May 13, 2021

Related U.S. Application Data

(63) Continuation of application No. 16/526,831, filed on Jul. 30, 2019, which is a continuation of application (Continued)

(51) Int. Cl.
*B60L 53/124*    (2019.01)
*G01V 9/00*    (2006.01)
(Continued)

(52) U.S. Cl.
CPC ............. *B60L 53/124* (2019.02); *B60L 53/12* (2019.02); *B60L 53/60* (2019.02); *G01V 3/10* (2013.01);
(Continued)

(58) Field of Classification Search
CPC ........ B60L 53/124; B60L 53/12; B60L 53/60; H02J 50/10; H02J 50/40; H02J 50/60;
(Continued)

(56) References Cited

U.S. PATENT DOCUMENTS 10,444,394 B2    10/2019    Widmer et al.
2012/0248888 A1*  10/2012    Kesler .................... H02J 50/70
                                                                  307/104
(Continued)

FOREIGN PATENT DOCUMENTS

CN         104040834          9/2014
CN         107112814 A  *   8/2017  ............. G01R 27/02
(Continued)

OTHER PUBLICATIONS

"Foreign Office Action", EP Application No. 17822979.5, dated Jul. 22, 2021, 6 pages.
(Continued)

*Primary Examiner* — Robert L Deberadinis
(74) *Attorney, Agent, or Firm* — Colby Nipper PLLC

(57) ABSTRACT

In certain aspects, an enclosure for a wireless power transfer pad is disclosed. The enclosure includes a cover shell configured to be positioned over a portion of the wireless power transfer pad configured to face a wireless power receiver when wirelessly transferring power, wherein at least a portion of the cover shell is made of a heat resistant material.

24 Claims, 15 Drawing Sheets

Related U.S. Application Data

No. 15/620,548, filed on Jun. 12, 2017, now Pat. No. 10,444,394.

(60) Provisional application No. 62/457,462, filed on Feb. 10, 2017, provisional application No. 62/444,714, filed on Jan. 10, 2017.

(51) Int. Cl.
| | |
|---|---|
| *G01V 11/00* | (2006.01) |
| *G01V 3/10* | (2006.01) |
| *B60L 53/60* | (2019.01) |
| *H02J 50/40* | (2016.01) |
| *H02J 7/04* | (2006.01) |
| *B60L 53/12* | (2019.01) |
| *H02J 50/10* | (2016.01) |
| *H02J 50/60* | (2016.01) |
| *H01F 5/00* | (2006.01) |

(52) U.S. Cl.
CPC .............. *G01V 3/101* (2013.01); *G01V 9/005* (2013.01); *G01V 11/00* (2013.01); *H02J 7/04* (2013.01); *H02J 50/10* (2016.02); *H02J 50/40* (2016.02); *H02J 50/60* (2016.02); *H01F 5/00* (2013.01)

(58) Field of Classification Search
CPC .. H02J 7/04; G01V 3/10; G01V 3/101; G01V 9/005; G01V 11/00; G01V 9/00; H01F 5/00
See application file for complete search history.

(56) References Cited

U.S. PATENT DOCUMENTS

| | | |
|---|---|---|
| 2013/0163635 A1 | 6/2013 | Karanth et al. |
| 2014/0084859 A1 | 3/2014 | Hall et al. |
| 2015/0331135 A1 | 11/2015 | Widmer |
| 2016/0187519 A1 | 6/2016 | Widmer et al. |
| 2016/0187520 A1 | 6/2016 | Widmer et al. |
| 2018/0198323 A1 | 7/2018 | Widmer et al. |
| 2019/0333693 A1 | 10/2019 | Nishimura |
| 2019/0353816 A1 | 11/2019 | Widmer et al. |

FOREIGN PATENT DOCUMENTS

| | | |
|---|---|---|
| EP | 2679970 | 1/2014 |
| EP | 2779359 | 9/2014 |
| GB | 2509015 | 6/2014 |
| WO | 2012004092 | 11/2015 |
| WO | 2015175406 | 11/2015 |

OTHER PUBLICATIONS

"Foreign Office Action and Search Report", Chinese Application No. 2017800826390, dated Jun. 3, 2020, 16 pages.

"International Preliminary Reporton Patentability", PCT Application No. PCT/US2017/066095, dated Jul. 25, 2019, 9 pages.

"International Search Report and Written Opinion", PCT Application No. PCT/US2017/066095, dated Mar. 27, 2018, 15 pages.

"Non-Final Office Action", U.S. Appl. No. 15/620,548, dated Mar. 22, 2019, 10 pages.

"Notice of Allowance", U.S. Appl. No. 15/620,548, dated May 2, 2019, 9 pages.

"Non-Final Office Action", U.S. Appl. No. 16/526,831, dated Jun. 22, 2022, 7 pages.

"Notice of Allowance", U.S. Appl. No. 16/526,831, dated Sep. 23, 2022, 7 pages.

\* cited by examiner

US 11,571,976 B2

FOREIGN OBJECT DETECTION USING HEAT SENSITIVE MATERIAL AND INDUCTIVE SENSING

CROSS-REFERENCE TO RELATED APPLICATIONS

This application claims the benefit of U.S. patent application Ser. No. 16/526,831, filed Jul. 30, 2019, and of U.S. patent application Ser. No. 15/620,548, filed Jun. 12, 2017, which is now U.S. Pat. No. 10,444,394, issued Oct. 15, 2019, and of U.S. Provisional Patent Application No. 62/444,714, filed Jan. 10, 2017 and of U.S. Provisional Patent Application No. 62/457,462, filed Feb. 10, 2017. The content of each of which is hereby incorporated by reference in its entirety.

FIELD

This application is generally related to wireless charging power transfer applications, and specifically to a method and apparatus for detecting foreign objects using heat sensitive material and inductive sensing.

BACKGROUND

Wireless power transfer systems (e.g., inductive charging systems for electric vehicles) may include a ground-based wireless power transmitter (e.g., a base pad, base wireless charging system, or some other wireless power transfer device including a coupler (e.g., base coupler)) configured to emit a wireless power field to a wireless power receiver (e.g., a vehicle pad, an electric vehicle wireless charging unit, or some other wireless power receiving device including a coupler (e.g., vehicle coupler)) configured to receive the wireless power field on the bottom of the vehicle. In such wireless power transfer systems, the space between the wireless power transmitter on the ground and the wireless power receiver on the vehicle may be open and accessible by foreign objects. For example, foreign objects may accidentally or intentionally be positioned in the space between the wireless power transmitter and the wireless power receiver. Where the foreign object is conducting and/or ferromagnetic (e.g., a metallic object, such as a paper clip, screw, etc.)), when the foreign object is exposed to the wireless charging field between the wireless power transmitter and the wireless power receiver, it may reach high temperatures (e.g., over 200 degrees C.), for example due to eddy current and hysteresis effects caused by the wireless charging field, if flux density levels exceed certain critical levels. The high temperatures the foreign object may potentially reach may damage the wireless power transmitter. For example, the foreign object may sit on the wireless power transmitter and cause portions of the wireless power transmitter to melt or burn, or may itself melt into the wireless power transmitter. Further, detecting the foreign object using certain foreign object detection (FOD) techniques may not be feasible, such as due to the object being small and difficult to detect, or may be too costly. Accordingly, a method and apparatus for detecting foreign objects as described is desirable.

SUMMARY

In certain aspects, a foreign object detection system is disclosed. The foreign object detection system includes a heat sensing system comprising a heat sensitive material having a property configured to change as a function of temperature. The foreign object detection system further includes an inductive sensing system comprising one or more sense coils, wherein a change in an electrical characteristic of the one or more sense coils is indicative of presence of a foreign object. The foreign object detection system further includes a controller coupled to the heat sensing system and the inductive sensing system, wherein the controller is configured to determine presence of the foreign object based on at least one of a measure of the property of the heat sensitive material or a measure of the electrical characteristic of the one or more sense coils.

In certain aspects, a method for controlling a foreign object detection system is disclosed. The method includes determining a change in a property of a heat sensitive material. The method further includes determining a change in an electrical characteristic of one or more sense coils. The method further includes determining presence of a foreign object based on at least one of the determined change in the property of the heat sensitive material or the determined change in the electrical characteristic of one or more sense coils.

In certain aspects, a foreign object detection system is disclosed. The foreign object detection system includes first means for sensing presence of a foreign object based on temperature. The foreign object detection system further includes second means for sensing presence of the foreign object based on inductance. The foreign object detection system further includes means for determining presence of the foreign object based on at least one of the first means for sensing or the second means for sensing.

DETAILED DESCRIPTION

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
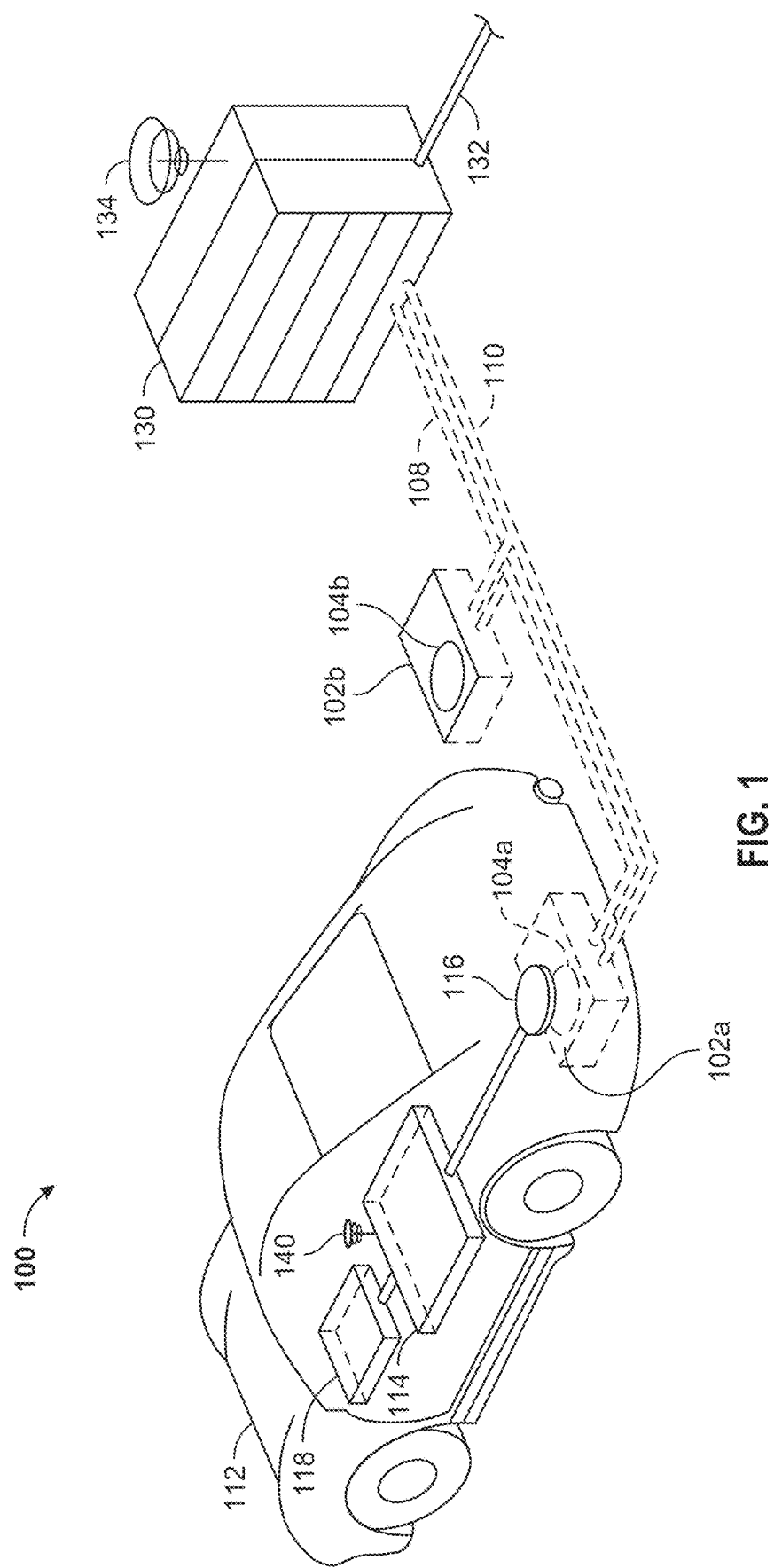
FIG. 1 illustrates a wireless power transfer system for charging an electric vehicle, in accordance with some implementations.

FIG. 1 is a diagram of an exemplary wireless power transfer system 100 for charging an electric vehicle, in accordance with some exemplary implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some exemplary implementations, the electric vehicle coupler 116 may receive power when the electric vehicle coupler 116 is located in an electromagnetic field produced by the base coupler 104a. The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to a "near-field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about ½π of a wavelength of the a frequency of the electromagnetic field produced by the base coupler 104a distant from the base coupler 104a, as will be further described below.

Local distribution center 130 may be configured to communicate with external sources (e.g., a power grid) via a communication backhaul 134, and with the base wireless charging system 102a via a communication link 108.

In some implementations the electric vehicle coupler 116 may be aligned with the base coupler 104a and, therefore, disposed within a near-field region simply by the electric vehicle operator positioning the electric vehicle 112 such that the electric vehicle coupler 116 is sufficiently aligned relative to the base coupler 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
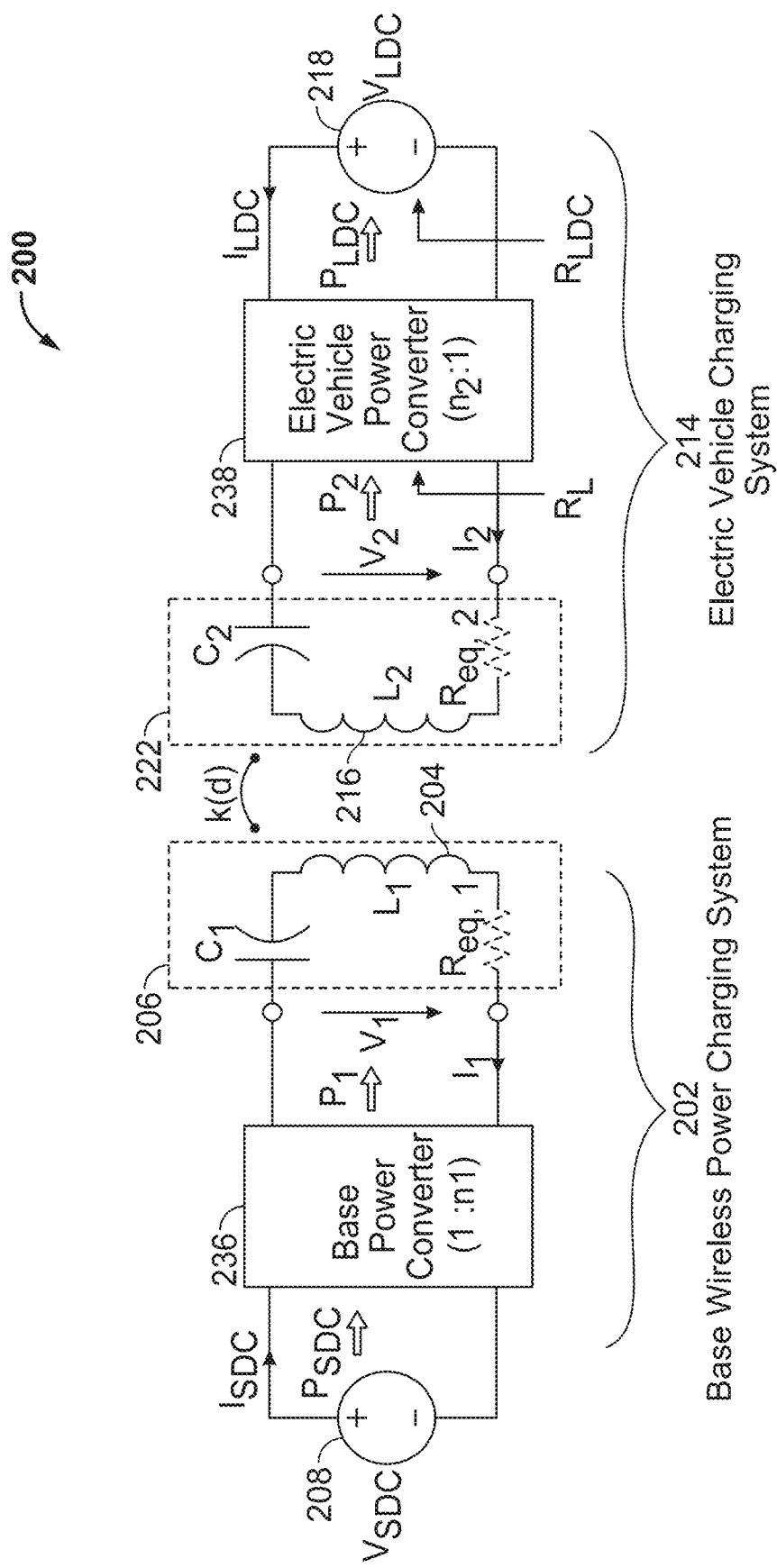
FIG. 2 is a schematic diagram of exemplary components of the wireless power transfer system of FIG. 1.

FIG. 2 is a schematic diagram of exemplary components of a wireless power transfer system 200 similar to that previously discussed in connection with FIG. 1, in accordance with some exemplary implementations. The wireless power transfer system 200 may include a base resonant circuit 206 including a base coupler 204 having an inductance L1. The wireless power transfer system 200 further includes an electric vehicle resonant circuit 222 including an electric vehicle coupler 216 having an inductance L2. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle coupler 216 and the base coupler 204. Using resonant structures for coupling energy may be referred to as "magnetically coupled resonance," "electromagnetically coupled resonance," and/or "resonant induction." The operation of the wireless power transfer system 200 will be described based on power transfer from a base coupler 204 to an electric vehicle 112 (not shown), but is not limited thereto. For example, as discussed above, energy may be also transferred in the reverse direction.

With reference to FIG. 2, a power supply 208 (e.g., AC or DC) supplies power PSDC to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power P1 to the base resonant circuit 206 including tuning capacitor C1 in series with base coupler 204 to emit an electromagnetic field at the operating frequency. The series-tuned resonant circuit 206 should be construed as exemplary. In another implementation, the capacitor C1 may be coupled with the base coupler 204 in parallel. In yet other implementations, tuning may be formed of several reactive elements in any combination of parallel or series topology. The capacitor C1 may be provided to form a resonant circuit with the base coupler 204 that resonates substantially at the operating frequency. The base coupler 204 receives the power P1 and wirelessly transmits power at a level sufficient to charge or power the electric vehicle. For example, the level of power provided wirelessly by the base coupler 204 may be on the order of kilowatts (kW) (e.g., anywhere from 1 kW to 110 kW, although actual levels may be or higher or lower).

The base resonant circuit 206 (including the base coupler 204 and tuning capacitor C1) and the electric vehicle resonant circuit 222 (including the electric vehicle coupler 216 and tuning capacitor C2) may be tuned to substantially the same frequency. The electric vehicle coupler 216 may be positioned within the near-field of the base coupler and vice versa, as further explained below. In this case, the base coupler 204 and the electric vehicle coupler 216 may become coupled to one another such that power may be transferred wirelessly from the base coupler 204 to the electric vehicle coupler 216. The series capacitor C2 may be provided to form a resonant circuit with the electric vehicle coupler 216 that resonates substantially at the operating frequency. The series-tuned resonant circuit 222 should be construed as being exemplary. In another implementation, the capacitor C2 may be coupled with the electric vehicle coupler 216 in parallel. In yet other implementations, the electric vehicle resonant circuit 222 may be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle couplers 204 and 216 and the tuning (anti-reactance) capacitors C1 and C2, respectively. The electric vehicle resonant circuit 222, including the electric vehicle coupler 216 and capacitor C2, receives and provides the power P2 to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power PLDC to the load 218. The power supply 208, base power converter 236, and base coupler 204 may be stationary and located at a variety of locations as discussed above. The electric vehicle load 218 (e.g., the electric vehicle battery unit), electric vehicle power converter 238, and electric vehicle coupler 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle coupler 216 to the base wireless power charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) (not shown) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle coupler 216 to the electric vehicle power converter 238. Disconnecting the electric vehicle coupler 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base coupler 204 as further explained below.

As described above, in operation, during energy transfer towards an electric vehicle (e.g., electric vehicle 112 of FIG. 1), input power is provided from the power supply 208 such that the base coupler 204 generates an electromagnetic field for providing the energy transfer. The electric vehicle coupler 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle coupler 216 is located in the near-field coupling mode region of the base coupler 204 as further explained below.

As stated, an efficient energy transfer occurs by transferring energy via a magnetic near-field rather than via electromagnetic waves in the far field, which may involve substantial losses due to radiation into the space. When in the near-field, a coupling mode may be established between the transmit coupler and the receive coupler. The space around the couplers where this near-field coupling may occur is referred to herein as a near-field coupling mode region.

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle coupler 216 and base coupler 204 as described throughout the disclosed implementations may be referred to or configured as "conductor loops", and more specifically, "multi-turn conductor loops" or coils. The base and electric vehicle couplers 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a coupler (e.g., the base coupler 204 and capacitor C2) as described above. As shown in FIG. 2, inductance may generally be the inductance of the coupler, whereas, capacitance may be added to the coupler to create a resonant structure at a desired resonant frequency. Accordingly, for larger size couplers using larger diameter coils exhibiting larger inductance, the value of capacitance needed to produce resonance may be lower. Inductance may also depend on a number of turns of a coil. Furthermore, as the size of the coupler increases, coupling efficiency may increase. This is mainly true if the size of both base and electric vehicle couplers increase. Furthermore a resonant circuit including a coupler and tuning capacitor may be designed to have a high quality (Q) factor to improve energy transfer efficiency. For example, the Q factor may be 300 or greater.

As described above, according to some implementations, coupling power between two couplers that are in the near-field of one another is disclosed. As described above, the near-field may correspond to a region around the coupler in which mainly reactive electromagnetic fields exist. If the physical size of the coupler is much smaller than the wavelength, inversely proportional to the frequency, there is no substantial loss of power due to waves propagating or radiating away from the coupler. Near-field coupling-mode regions may correspond to a volume that is near the physical volume of the coupler, typically within a small fraction of the wavelength. According to some implementations, magnetic couplers, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" couplers (e.g., dipoles and monopoles) or a combination of magnetic and electric couplers may be used.

Figure 3:
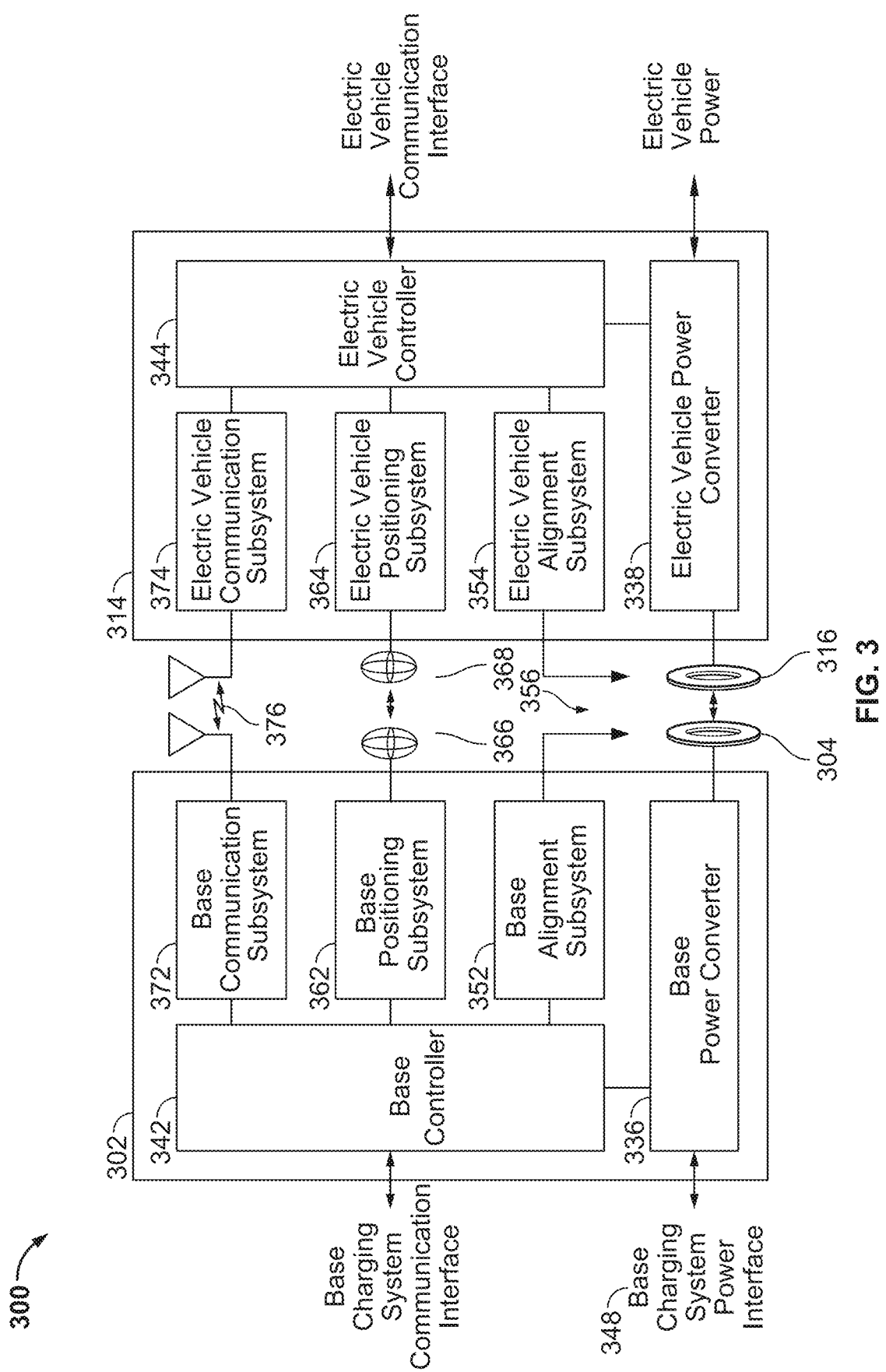
FIG. 3 is a functional block diagram showing exemplary components of the wireless power transfer system of FIG. 1.

FIG. 3 is a functional block diagram showing exemplary components of wireless power transfer system 300, which may be employed in wireless power transfer system 100 of FIG. 1 and/or that wireless power transfer system 200 of FIG. 2 may be part of. The wireless power transfer system 300 illustrates a communication link 376, a positioning link 366, using, for example, a magnetic field signal for determining a position or direction, and an alignment mechanism 356 capable of mechanically moving one or both of the base coupler 304 and the electric vehicle coupler 316. Mechanical (kinematic) alignment of the base coupler 304 and the electric vehicle coupler 316 may be controlled by the base alignment subsystem 352 and the electric vehicle charging alignment subsystem 354, respectively. The positioning link 366 may be capable of bi-directional signaling, meaning that positioning signals may be emitted by the base positioning subsystem or the electric vehicle positioning subsystem or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base coupler 304 at a frequency near or at the resonant frequency of the base resonant circuit 206 with reference to FIG. 2. The electric vehicle coupler 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle coupler 316 to a power signal suitable for charging a battery via the electric vehicle power interface.

The base wireless charging system 302 includes a base controller 342 and the electric vehicle wireless charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication subsystem 372 and electric vehicle communication subsystem 374 may include subsystems or modules for specific application with separate communication channels and also for wirelessly communicating with other communications entities not shown in the diagram of FIG. 3. These communications channels may be separate physical channels or separate logical channels. As non-limiting examples, a base alignment subsystem 352 may communicate with an electric vehicle alignment subsystem 354 through communication link 376 to provide a feedback mechanism for more closely aligning the base coupler 304 and the electric vehicle coupler 316, for example via autonomous mechanical (kinematic) alignment, by either the electric vehicle alignment subsystem 354 or the base alignment subsystem 352, or by both, or with operator assistance.

The electric vehicle wireless charging system 314 may further include an electric vehicle positioning subsystem 364 connected to a magnetic field generator 368. The electric vehicle positioning subsystem 364 may be configured to drive the magnetic field generator 368 with currents that generate an alternating magnetic field. The base wireless charging system 302 may include a magnetic field sensor 366 connected to a base positioning subsystem 362. The magnetic field sensor 366 may be configured to generate a plurality of voltage signals under influence of the alternating magnetic field generated by the magnetic field generator 368. The base positioning subsystem 362 may be configured to receive these voltage signals and output a signal indicative of a position estimate and an angle estimate between the magnetic field sensor 366 and the magnetic field sensor 368. These position and angle estimates may be translated into visual and/or acoustic guidance and alignment information that a driver of the electric vehicle may use to reliably park the vehicle. In some implementations, these position and angle estimates may be used to park a vehicle automatically with no or only minimal driver intervention (drive by wire).

Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle couplers 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may also support plug-in charging via a wired connection, for example, by providing a wired charge port (not shown) at the electric vehicle wireless charging system 314. The electric vehicle wireless charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle wireless charging system 314, the wireless power transfer system 300 may use in-band signaling via base and electric vehicle couplers 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle couplers 304 and 316 may also be configured to act as wireless communication antennas. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base coupler 304. By way of example, a load sensing circuit monitors the current flowing to a power amplifier of the base power converter 336, which is affected by the presence or absence of active power receivers in the near-field coupling mode region of the base coupler 304. Detection of changes to the loading on the power amplifier may be monitored by the base controller 342 for use in determining whether to enable the base wireless charging system 302 for transmitting energy, to communicate with a receiver, or a combination thereof.

As discussed herein, a foreign object may be positioned between a wireless power transmitter (e.g., a base pad, base wireless charging system 102, 202, 302, etc., or some other wireless power transfer device including a coupler (e.g., base coupler 104, 204, 304, etc.)) configured to emit a wireless power field to a wireless power receiver (e.g., a vehicle pad, an electric vehicle wireless charging unit 114, 214, 314, etc., or some other wireless power receiving device including a coupler (e.g., vehicle coupler 116, 216, 316, etc.)). Such foreign objects may heat up when exposed to a wireless charging field, and may potentially damage the wireless power transmitter.

Accordingly, a method and apparatus for protecting a wireless power transfer pad of a wireless power transmitter as described is desirable. In particular, certain aspects herein provide an at least partially heat sensitive enclosure for a wireless power transfer pad of a wireless power transmitter to detect foreign objects. Further, certain aspects combine heat sensing at a wireless power transfer pad with inductive sensing to detect foreign objects. Though certain aspects and materials are described herein with respect to materials that change resistance due to changes in temperature, it should be noted that materials that change other types of electrical and non-electrical properties (e.g., impedance, capacitance, refractive index, mass density, etc.) may similarly be used in different aspects and those properties measured instead of resistance as described. Detection of changes to the properties of a heat sensitive material and/or changes to electrical characteristics of inductive sense coils may be monitored or measured by a controller such as the base controller 342, or another appropriate circuit, processor, integrated circuit, etc., which is further configured to control appropriate action if the detected changes to the properties of the heat sensitive materials and/or changes to electrical characteristics of inductive sense coils indicate presence of a foreign object. Further, though certain aspects are described herein with respect to detecting foreign objects at a wireless power transfer pad, similar techniques may be used for foreign object detection for other implementations.

In certain aspects, a wireless power transfer pad may include one or more portions of a heat sensitive enclosure that are aligned with a wireless charging field emitted by the wireless power transmitter, such as a coupler, resonant circuit, etc. The heat sensitive enclosure can advantageously be configured to or for part of a system configured to detect foreign objects in proximity to the wireless power transfer pad as discussed herein. Once the presence of a foreign object is detected, the wireless power transfer system may go into a low power mode, reduce power, turn off, or issue alerts prompting a user to remove the foreign object. In some aspects, the heat sensitive enclosure may include heat sensitive resistance material and, in some other aspects, the heat sensitive enclosure may include heat sensitive impedance or capacitance material. A heat sensitive resistance material may be configured to change resistance based on a temperature of the material. Similarly, a heat sensitive impedance material, heat sensitive capacitance material, or other heat sensitive material may be configured to change impedance, capacitance, or another electrical or non-electrical property, respectively, based on a temperature of the material.

In some other aspects, the heat sensitive material may constitute a waveguide with one or more wave propagation characteristics being temperature sensitive. In some implementations, the heat sensitive material constitutes a waveguide for electromagnetic waves e.g. in the visible light, infrared, or microwave spectrum. In other implementations, the heat sensitive material constitutes a waveguide for acoustic waves e.g. ultrasound waves.

Heat sensitive materials for an optical waveguide may include an amorphous quartz glass (e.g. silica or a doped silica), or another material that is transparent or semi-transparent for electromagnetic waves in the visible light and that exhibit a measurable temperature sensitive characteristic. Heat sensitive materials of an optical waveguide may include materials that produce scattering of light accompanied by a spectral shift (wavelength shift) such as Raman scattering, Rayleigh scattering, or Brillouin scattering. They may also include materials that change a refracting index (grating) as a function of temperature.

Heat sensitive materials for a microwave waveguide may include a dielectric material with a characteristic (e.g. dielectric constant, loss coefficient, wave impedance, phase velocity, group velocity) that is heat sensitive.

Heat sensitive materials for an acoustic waveguide may include a material with a mass density substantially different from the materials used of the cover shell and with a wave propagation characteristic (e.g. phase velocity, group velocity, acoustic wave impedance) that is heat sensitive.

In some aspects, traditional materials that may be not be heat sensitive for protecting an enclosure may include one or more of polyethylene (PE), acrylonitrile butadiene styrene (ABS), polyoxymethylene (POM), and fibre-reinforced epoxy material.

Figure 4A:
FIG. 4A illustrates an example of an enclosure for a wireless power transfer pad, in accordance with an illustrative aspect.

FIG. 4A illustrates an example of an enclosure 400A for a wireless power transfer pad, in accordance with an illustrative aspect. For example, the wireless power transfer pad may be placed or positioned in the enclosure 400A. In particular, the enclosure 400A includes a cover shell 405A and a back plate 410A. In certain aspects, as shown, the cover shell 405A is placed over the portion of the wireless power transfer pad that faces a wireless power receiver when wirelessly transferring power. For example, the cover shell 405A may be positioned on a portion of the wireless power transfer pad that faces away from the ground (e.g., that is up from the ground) when the wireless power transfer pad is placed on the ground.

In certain aspects, as shown, the back plate 410A is placed below the portion of the wireless power transfer pad that faces a wireless power receiver when wirelessly transferring power. For example, the back plate 410A may be positioned on a portion of the wireless power transfer pad that faces toward the ground (e.g., that is on the ground) when the wireless power transfer pad is placed on the ground. In certain aspects, the back plate 410A may be omitted and the cover shell 405A may be positioned over the wireless power transfer pad (e.g., where the wireless power transfer pad is embedded in the ground).

In certain aspects, the back plate 410A is metallic (e.g., aluminum), made of plastic, or may be the same material as the cover shell 405A. As shown, the entire cover shell 405A may be made of a heat sensitive resistance (e.g., thermoresistive) material used to detect the presence of foreign objects between the wireless power transmitter and the wireless power receiver, as described above, and thus protect the wireless power transfer pad. In some aspects, a heat sensitive resistance material may be a material that changes its electrical conductivity (e.g., resistance) as a function of temperature. In some aspects, heat sensitive resistance material may have a resistance with a high temperature coefficient (e.g., a pronounced NTC (i.e., negative temperature coefficient) characteristic) such that its resistance substantially decreases as temperature rises, and increases as temperature decreases. For example, the conductivity of the heat sensitive resistance material may increase as the temperature passes a threshold. In some aspects, the threshold temperature may be 100° C.

In some aspects, the heat sensitive resistance material may act substantially as an insulator at temperatures below a threshold (e.g., 100° C.) and become electrically conductive when the temperature exceeds the threshold. In some aspects, the heat sensitive resistance material may be a doped polymer (e.g. CoolPoly from Celanese) that is non-conductive or slightly conductive at temperatures of, for example, below 100° C. and whose conductivity increases substantially when the temperature rises above 100° C.

Further, in some aspects, the heat sensitive resistance material may combine properties such as pronounced thermo-resistivity with mechanical strength, elasticity, heat resistance, and/or thermal conductivity. In such aspects, the heat sensitive resistance material may be resistant to mechanical impact, heat, bending, and/or compressive stress. Such mechanical strength or resistance may protect the wireless power transfer pad from physical damage. In addition, in such aspects, the heat sensitive resistance material may have an elasticity so as not to be brittle, thereby allowing the material to sag or bend under pressure without breaking (e.g., from a vehicle driving over the cover shell 405A). The thermal conductivity, in some aspects, may also prevent foreign objects to get excessively hot because a thermal conductive material absorbs and dissipates the heat from a hot foreign object away from the back plate 410A. Further, in some aspects, the heat sensitive resistance material may be suitable for injection molding. In some further aspects, the heat sensitive resistance material provides good machinability.

In some aspects, the heat sensitive resistance material may be a type of ceramic. In some other aspects, the heat sensitive resistance material may be a crystalline material with pronounced NTC characteristics (e.g. due to a phase change in the crystalline structure when temperature rises). A heat sensitive resistance material with an NTC characteristic decreases its resistance with an increase in its temperature. Further, in some aspects, the heat sensitive resistance material may be a heat sensitive electrical insulator that becomes conductive at a defined threshold temperature and remains conductive after the temperature has dropped below that threshold. In some aspects, the heat sensitive resistance material may be an electrical conductor with a pronounced positive temperature coefficient (PTC). A heat sensitive resistance material with a PTC characteristic increases its resistance with an increase in its temperature (e.g., above a threshold temperature) and decreases its resistance with a decrease in its temperature (e.g., below a threshold temperature). Though certain aspects and materials are described herein with respect to materials that change resistance due to changes in temperature, it should be noted that materials that change other types of electrical properties (e.g., impedance, capacitance, etc.) may similarly be used in different aspects and those electrical properties measured. As described above, in some aspects, heat sensitive impedance or capacitance material, or other heat sensitive material, may be used in any of the enclosures described herein in relation to FIGS. 4A-4D.

Cover shell 405A, made of the heat sensitive resistance material described above, may have a size and shape to cover at least the exposed portion of the wireless power transfer pad that is exposed to the wireless power field. As would be understood, cover shell 405A and/or back plate 410A may have any suitable size and/or shape.

Figure 4B:
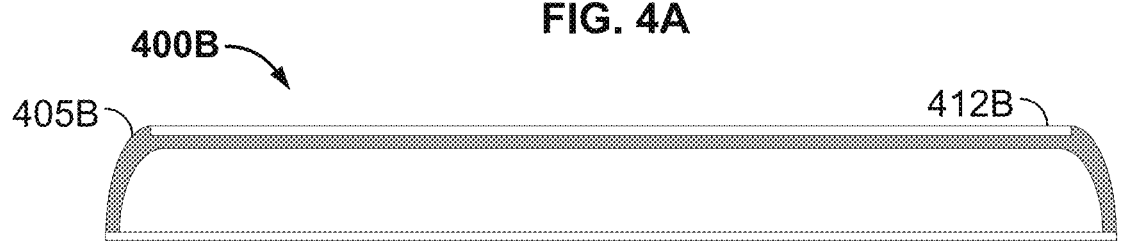
FIG. 4B illustrates an example of an enclosure for a wireless power transfer pad, in accordance with an illustrative aspect.

FIG. 4B illustrates an example of an enclosure 400B for a wireless power transfer pad, in accordance with an illustrative aspect. The enclosure 400B is similar to enclosure 400A, except that cover shell 405B is not entirely formed of the heat sensitive resistance material. Instead, as shown, cover shell 405B includes a heat sensitive resistance inlay 412B at the surface of the cover shell 405B. The heat sensitive resistance inlay 412B may be made of a heat sensitive resistance material as discussed herein. Further, the remaining portion of the cover shell may be made of a non-heat sensitive resistant material or cheaper material. By reducing the amount of heat sensitive resistancematerial used for cover shell 405B, the cost of enclosure 400B may be reduced, while still detecting foreign objects. In certain aspects, the heat sensitive resistance inlay 412B may cover a portion of the surface of cover shell 405B, or the entire surface.

Figure 4C:
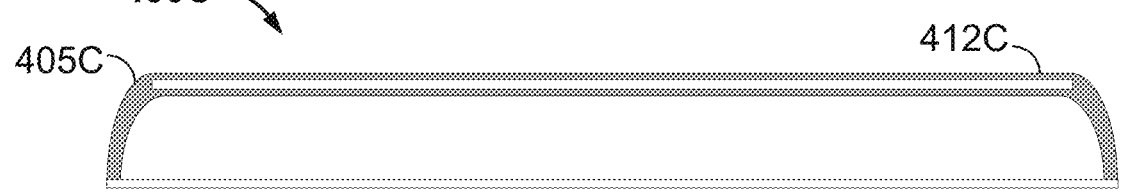
FIG. 4C illustrates an example of an enclosure for a wireless power transfer pad, in accordance with an illustrative aspect.

FIG. 4C illustrates an example of an enclosure 400C for a wireless power transfer pad, in accordance with an illustrative aspect. The enclosure 400C is similar to enclosure 400B, in that it includes a heat sensitive resistance inlay 412C, except that the heat sensitive resistance inlay 412C is embedded in the cover shell 405C instead of being at the surface of the cover shell 405C.

Figure 4D:
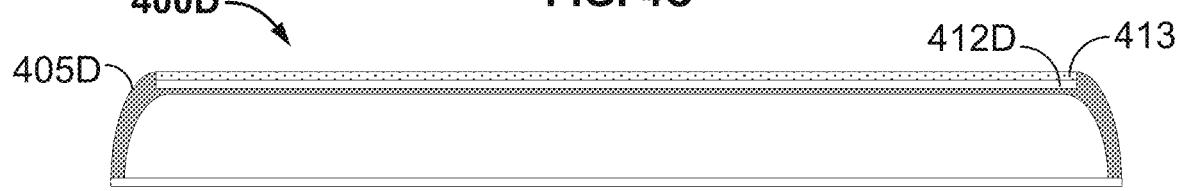
FIG. 4D illustrates an example of an enclosure for a wireless power transfer pad, in accordance with an illustrative aspect.

FIG. 4D illustrates an example of an enclosure 400D for a wireless power transfer pad, in accordance with an illustrative aspect. Enclosure 400D is similar to enclosures 400B and 400C, in that it includes a heat sensitive resistance inlay 412D (e.g., at the surface, or embedded in the cover shell 405D), except that cover shell 405D further includes heat resistant inlay 413. In enclosure 400D, heat sensitive resistance inlay 412D may be embedded in cover shell 405D (e.g. a few millimeters below the surface) while heat resistant inlay 413 may be placed above at the surface of cover shell 405D. In some aspects, heat sensitive resistance inlay 412D and heat resistant inlay 413 may be adjacent, as shown in FIG. 4D. In some other aspects, the entire cover shell 405D may be made of the heat sensitive resistant material with the heat resistant inlay 413 embedded in cover shell 405D. In some further aspects, the entire cover shell 405D may be made of a heat resistant material with the heat sensitive resistance inlay 412D embedded in cover shell 405D.

Figure 4E:
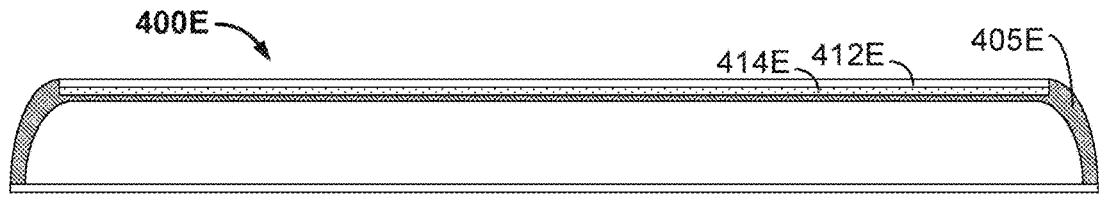
FIG. 4E illustrates an example of an enclosure for a wireless power transfer pad, in accordance with an illustrative aspect.

FIG. 4E illustrates an example of an enclosure 400E for a wireless power transfer pad, in accordance with an illustrative aspect. The enclosure 400E is similar to enclosures 400B, 400C, and 400D, in that it includes a heat resistance inlay 412E (e.g., at the surface as shown, or embedded in the cover shell 405E, made of tiles, etc.), except that the cover shell 405E further includes a thermal insulation layer 414E. The thermal insulation layer 414E, as shown, may be formed adjacent to (e.g., below) the heat resistance inlay 412E. In another example, the entire cover shell 405E may be made of heat resistant material with the thermal insulation layer 414E embedded in the cover shell 405E. The thermal insulation layer 414E may be made of a material with a low thermal conductivity (e.g., silica, carbon-carbon composite, fiberglass, etc.). The thermal insulation layer 414E may protect the wireless transfer pad from heat (e.g., generated by the foreign object). For example, though the heat resistant material of the enclosure 400E may prevent a hot object from physically contacting the wireless power transfer pad and damaging the wireless power transfer pad, in some aspects, heat may still pass through the heat resistant material to the wireless power transfer pad. The heat may damage electrical components of the wireless power transfer pad. Accordingly, the thermal insulation layer 414E may prevent/mitigate heat from the foreign object from reaching the wireless power transfer pad.

Figure 4F:
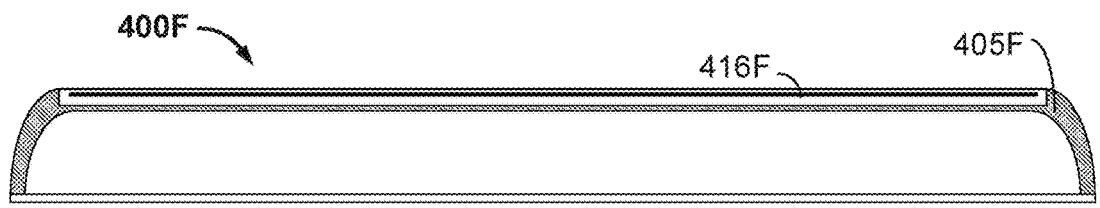
FIG. 4F illustrates an example of an enclosure for a wireless power transfer pad, in accordance with an illustrative aspect.

FIG. 4F illustrates an example of an enclosure 400F for a wireless power transfer pad, in accordance with an illustrative aspect. The enclosure 400F is similar to any of enclosures 400A-400E, except that the cover shell 405F further includes a foreign object detection (FOD) mechanism 416F embedded in the cover shell 405F. In some aspects, the FOD mechanism 416F includes an array of one or more coils (e.g., sense coils, loop coils, etc.). The array of one or more coils may be coupled to a controller (e.g., base controller 342) or some circuit configured to detect metal objects near the enclosure 400F, such as by detecting changes m electrical properties/characteristics of the array. For example, a metal object may change an electrical property (e.g., inductance) with respect to the wireless power transfer pad/wireless power field. In some aspects, the FOD mechanism 416F includes one or more of a temperature sensor, capacitive sensor, and a mechanical pressure (stress) sensor.

Figure 4G:
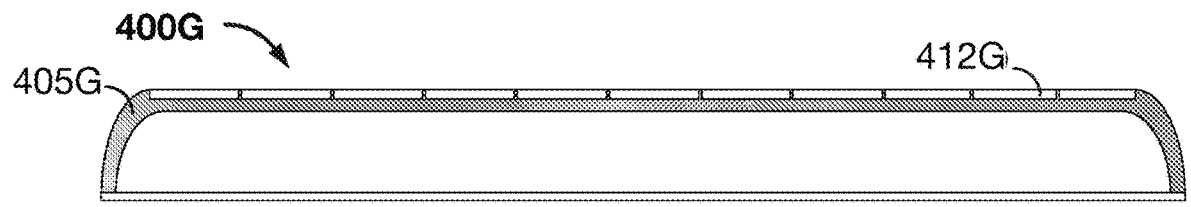
FIG. 4G illustrates an example of an enclosure for a wireless power transfer pad, in accordance with an illustrative aspect.

FIG. 4G illustrates an example of an enclosure 400D for a wireless power transfer pad, in accordance with an illustrative aspect. Enclosure 400D is similar to enclosures 400B and 400C, in that it includes a heat sensitive resistance inlay 412D (e.g., at the surface, or embedded in the cover shell 405D), except that cover shell 405D further includes heat resistant inlay 413. In enclosure 400D, heat sensitive resistance inlay 412D may be embedded in cover shell 405D (e.g. a few millimeters below the surface) while heat resistant inlay 413 may be placed above at the surface of cover shell 405D. In some aspects, heat sensitive resistance inlay 412D and heat resistant inlay 413 may be adjacent, as shown in FIG. 4D. In some other aspects, the entire cover shell 405D may be made of the heat sensitive resistant material with the heat resistant inlay 413 embedded in cover shell 405D. In some further aspects, the entire cover shell 405D may be made of a heat resistant material with the heat sensitive resistance inlay 412D embedded in cover shell 405D.

Heat resistant inlay 413 may include a heat resistant material able to withstand temperatures reached by foreign objects (e.g. over 200° C., 300° C., 400° C., etc.). In some aspects, the heat resistant material may have a melting point of, for example, above 200° C. and may have a heat conductivity that is substantially higher than that of prevalent plastic material. In some aspects, the heat resistant material may be flame retardant. In some aspects, the heat resistant material may also be resistant to mechanical impact, bending, and/or compressive stress. Such mechanical resistance may protect the wireless power transfer pad from physical damage. In some aspects, the heat resistant material may have an elasticity so as not to be brittle, thereby allowing the material to sag or bend under pressure without breaking (e.g., from a vehicle driving over the cover shell 405A). In some aspects, the heat resistant material may have a high thermal conductivity to dissipate heat (e.g., heat produced by a foreign object). In some aspects, the heat resistant material is resistant to long term ultraviolet (UV) exposure. In some aspects, the heat resistant material is resistant to damage from chemical substances (e.g., lubricating and diesel oils, gasoline, brake fluid, coolant, solvents, etc.). In some aspects, the heat resistant material has a low thermal expansion to avoid bulging or deformation due to heat (e.g., from the foreign object). In some aspects, the heat resistant material is electrically non-conductive, such as to not generate eddy or displacement currents when exposed to a wireless power field. In some aspects, the heat resistant material is non-magnetic to avoid interaction with the wireless power field. In some aspects, the heat resistant material is low cost. In some aspects, the heat resistant material has a high autoignition temperature. In some aspects, the heat resistant material provides good machinability. Further, in some aspects, the heat resistant material may be suitable for injection molding.

For example, the heat resistant material of heat resistant inlay 413 may include one or more of plastics such as nylon resins (e.g., Minlon, Zytel from Dupont, etc.), perfluoroelastomers (e.g., Kalrez from Dupont), polymerized siloxanes (e.g., silicone rubber), glass or carbon-fibre reinforced plastics, structural composites (e.g., PyroSic, PyroKarb from Pyromeral systems), a sintered high temperature polymer (e.g. polyimides (PI) such as TECASINT from Ensinger), and/or ceramic matrix composites (CMC) (e.g., glass-ceramics). In some aspects, the heat resistant material may include multiple layers, such as a layer including a first plastic material with a high heat resistance (e.g., greater than 200° C.) and a high ignition temperature (e.g., greater than 600° C.), and a second layer including a highly heat resistant mesh structure (e.g., greater than 600° C.) made of a second material, such as carbon fibers, that prevent an object from sinking into the pad enclosure when the first plastic material starts melting. In some aspects, hot foreign objects laying on the wireless power transfer pad's surface may be detected by sensing a change in the electrical resistance of heat sensitive resistance inlay 412D.

Figure 5:
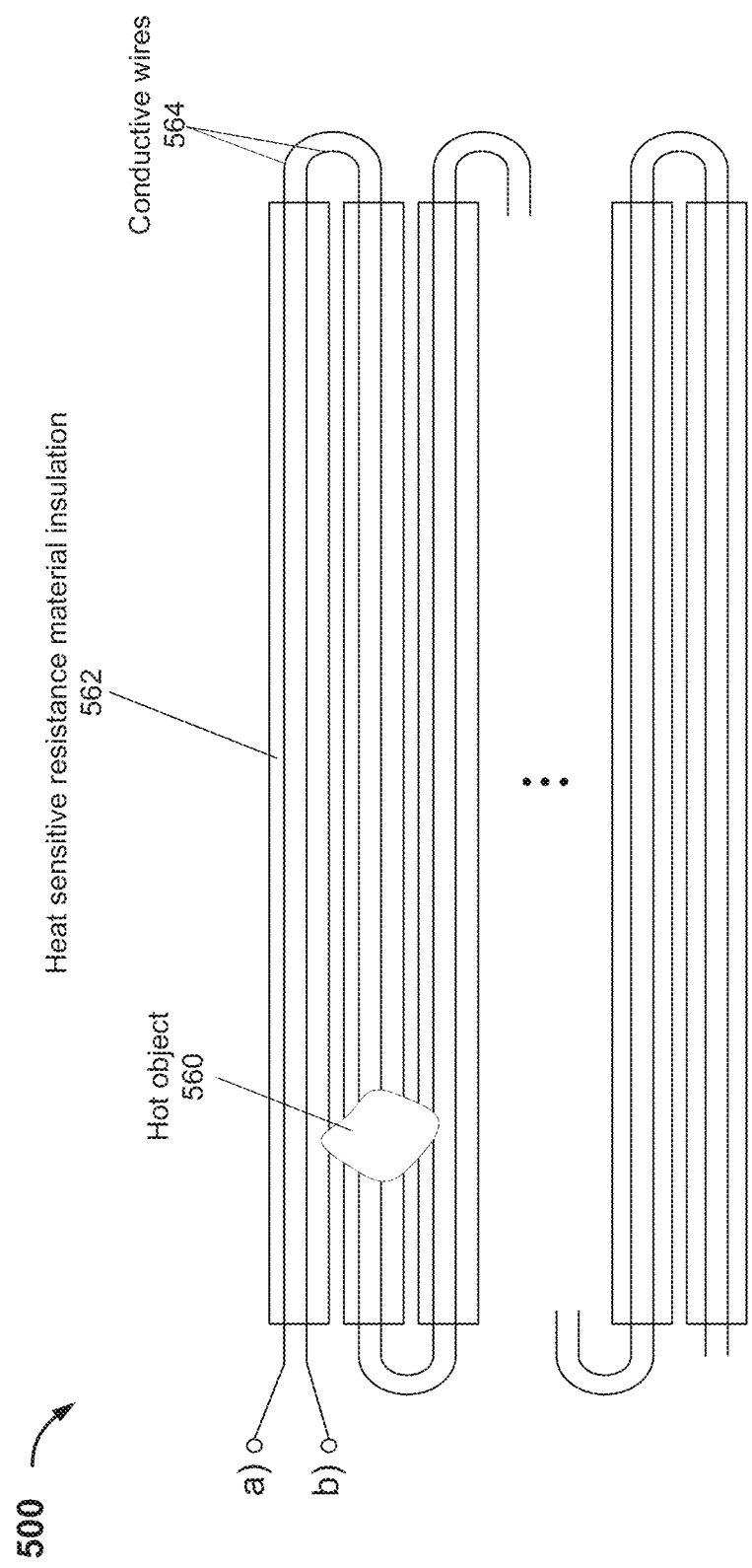
FIG. 5 illustrates an example of a heat sensitive layer, in accordance with an illustrative aspect.

FIG. 5 illustrates an example of heat sensitive resistance layer 500, in accordance with an illustrative aspect. For example, heat sensitive resistance layer 500 may be made of at least one heat sensitive resistance material that is configured to change resistance based on a temperature of the material (e.g., as discussed). The heat sensitive resistance layer may include a cable comprising at least two electrically conductive wires 564 embedded in insulation 562, which may include heat sensitive resistance material. The cable may be arranged in serpentines as shown in FIG. 2 or in a spiral or meandering structure to cover the wireless power transfer pad's surface, where foreign objects (e.g. metallic objects) may get hot if exposed to the inductive power transfer (IPT) magnetic fields. In some aspects, the presence of a hot foreign object 560 laying on the wireless power transfer pad's surface may result in a local change of the resistance of cable insulation 562 (e.g., the local resistance may decrease). Accordingly, the presence of the hot foreign object may be detected by sensing a change in the resistance based on change in resistance of the cable insulation 562. In some aspects, this may be performed by measuring the resistance between terminals a and b as shown in FIG. 5. In such aspects, the cable wires may be open circuited throughout the cable. For example, since the cable insulation 562 is made of a heat sensitive resistance material, the conductivity of the cable insulation 562 changes as the temperature of the cable insulation 562 (e.g., based on exposure to the hot foreign object) changes. Since terminals a and b are open circuited, the only electrical path between terminals a and b is via the cable insulation 562. Therefore, a measure of the resistance between terminals a and b is also a measure of resistance/conductivity of the cable insulation 562. Accordingly, a change in temperature of the cable insulation 562 changes a measure of resistance between terminals a and b. In certain aspects, the terminals a and b are coupled to a controller (e.g., base controller 342) or other measuring circuit, which measures the resistance/conductivity between terminals a and b (e.g., of the cable insulation 562). The measuring circuit may further be coupled to a controller (e.g., base controller 342) which takes appropriate action based on the measured resistance/conductivity. For example, if the measured resistance/conductivity does not satisfy a threshold for indicating presence of a foreign object, the controller may take no action/allow wireless power transfer to continue. In another example, if the measured resistance/conductivity does satisfy a threshold for indicating presence of a foreign object, the controller may take action to stop or restrict wireless power transfer and/or generate an alert (e.g., audible, visual, etc.).

Figure 6:
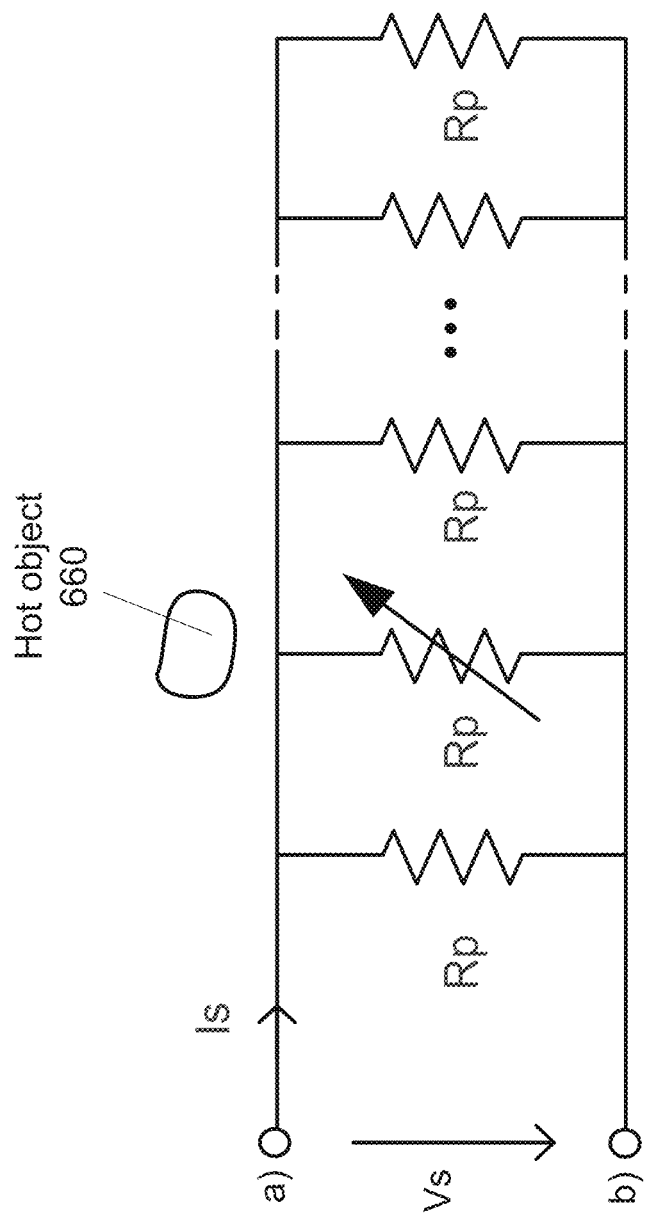
FIG. 6 illustrates an example of a circuit corresponding to the heat sensitive layer of FIG. 5, in accordance with an illustrative aspect.

FIG. 6 illustrates an example of a circuit corresponding to the cable shown in FIG. 5, in accordance with an illustrative aspect. FIG. 6 shows a series of discrete resistances Rp connected in parallel corresponding to the resistance of the cable insulation (e.g., 562) between the conductive wires a and b (e.g., 564). In some aspects, resistance Rp (as shown by the arrow) may change when in proximity of hot foreign object 660. This change in resistance may result in a change of sense current Is if sense voltage Vs is applied across terminals a and b (e.g., a measuring circuit). In the parallel arrangement, shown in FIG. 6, a change of resistance Rp may be particularly pronounced if the heat sensitive resistance material in the insulation around the conductive wires has an NTC characteristic. In some aspects, the heat sensitive resistance insulator (e.g. insulator 562) may produce an electrical short circuit once the temperature has exceeded a defined threshold, such as 200° C.

Figure 7:
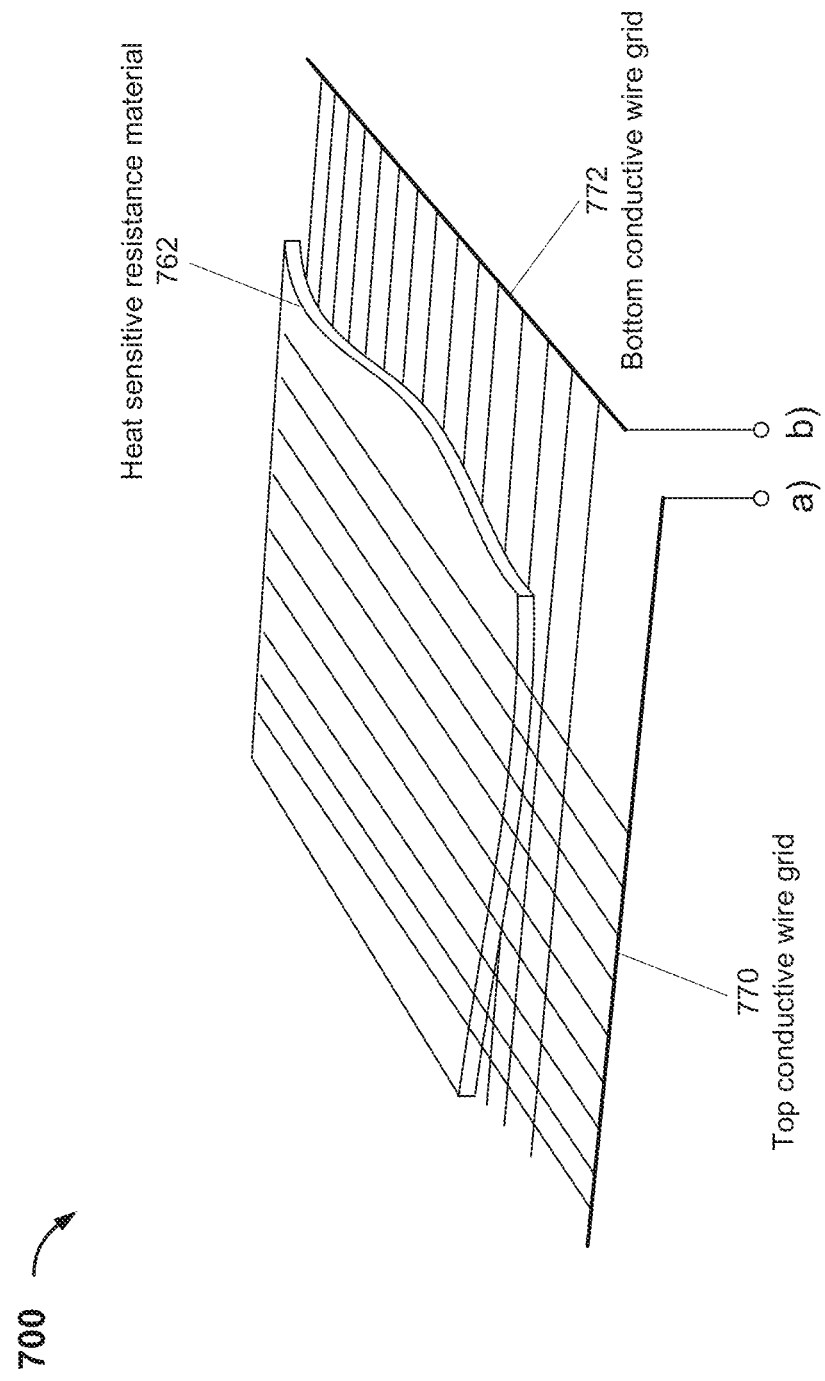
FIG. 7 illustrates an example of a heat sensitive layer, in accordance with an illustrative aspect.

FIG. 7 illustrates an example of a heat sensitive resistance layer 700, in accordance with an illustrative aspect. As shown in FIG. 7, heat sensitive resistance layer 700 may include a top conductive wire grid (electrode a) 770, a bottom conductive wire grid (electrode b) 772, and an intermediate layer of heat sensitive resistance material 762. As described above in relation to FIGS. 5 and 6, the presence of a hot foreign object laying on the wireless power transfer pad's surface may be detected by sensing a change in the resistance as measured between terminals a and b. This is because heat sensitive resistance material 762 may become conductive when a certain temperature is exceeded. This may then result in a low resistance circuit whereby top conductive wire grid 770 may conduct to bottom conductive wire grid 772 through heat sensitive resistance material 762. The low resistance as measured between terminals a and b may then indicate the presence of a hot foreign object.

In some aspects, the conductive wire grid (e.g. 770 and 772, combined) may be designed such that reduced eddy current losses occur in the presence of strong IPT magnetic fields (avoiding current loops). In some aspects, other electrode grid structures may apply as well (e.g. serpentine or meander-shaped structures). In some aspects, heat sensitive resistance layer 762 may be a printed wire board (PWB) with thin conductive traces minimizing eddy current losses. In some aspects, this PWB may also integrate the sense coils of an inductive sensing-based foreign object detection system.

Figure 8:
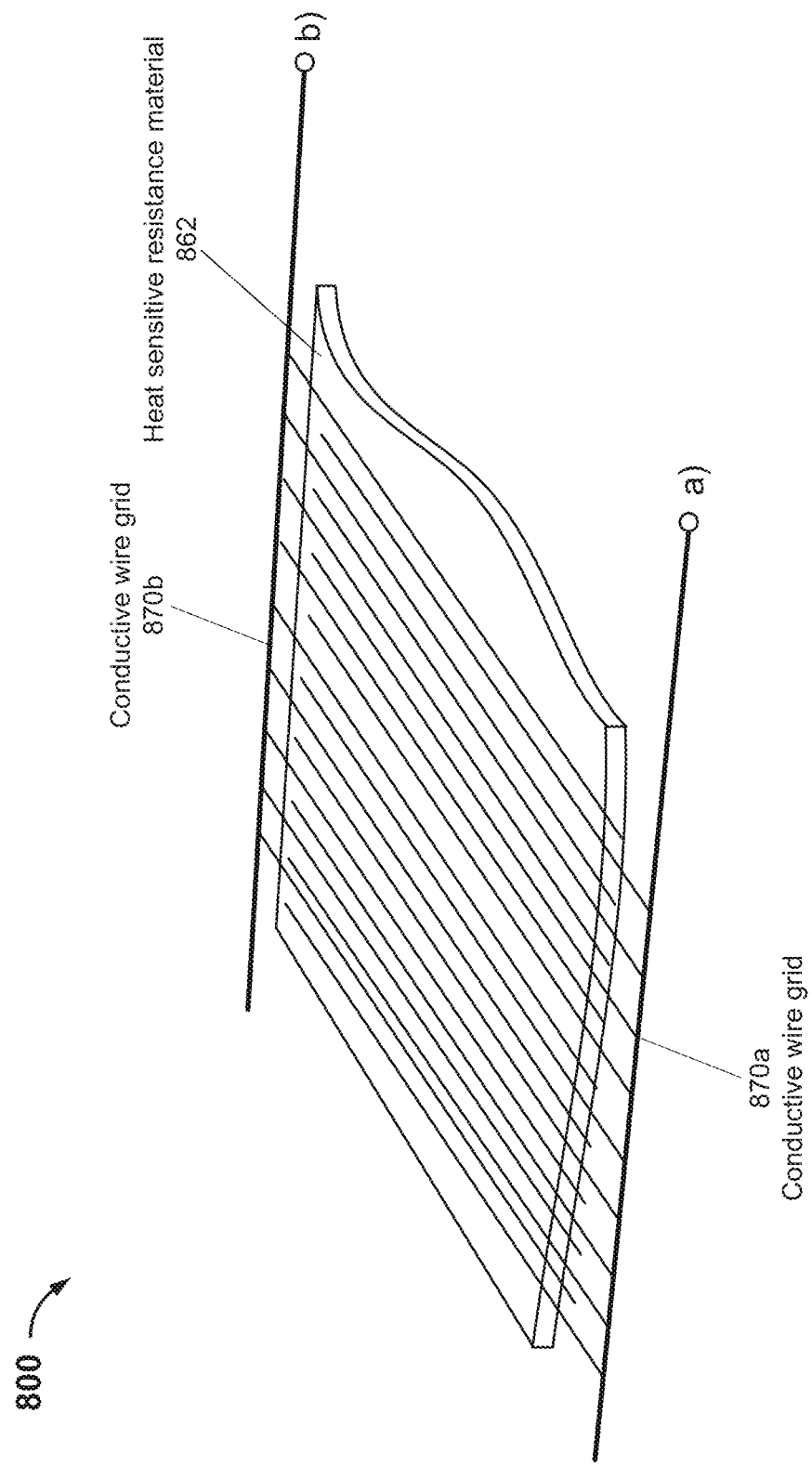
FIG. 8 illustrates an example of a heat sensitive layer, in accordance with an illustrative aspect.

FIG. 8 illustrates an example of a heat sensitive resistance layer 800, in accordance with an illustrative aspect. Heat sensitive resistance layer 800 is similar to heat sensitive resistance layer 700, except that in FIG. 8 conductive wire grids 870a and 870b (electrodes a and b) are disposed only on one side of heat sensitive resistance layer 800. In some aspects, as shown in FIG. 8, the conductive wire grids 870a and 870b may be placed on top of heat sensitive resistance material 862. In some aspects, conductive wire grids 870a and 870b may be interleaved as shown in FIG. 8. In some aspects (not shown), interleaved serpentine, spiral or meander-shaped electrode structures may be disposed on one side of heat sensitive resistance layer 800. Sensing a change in resistance, detecting a foreign object, and/or protecting the wireless transfer pad by shorting the circuit may all be performed as described in relation to FIGS. 5-7.

Figure 9:
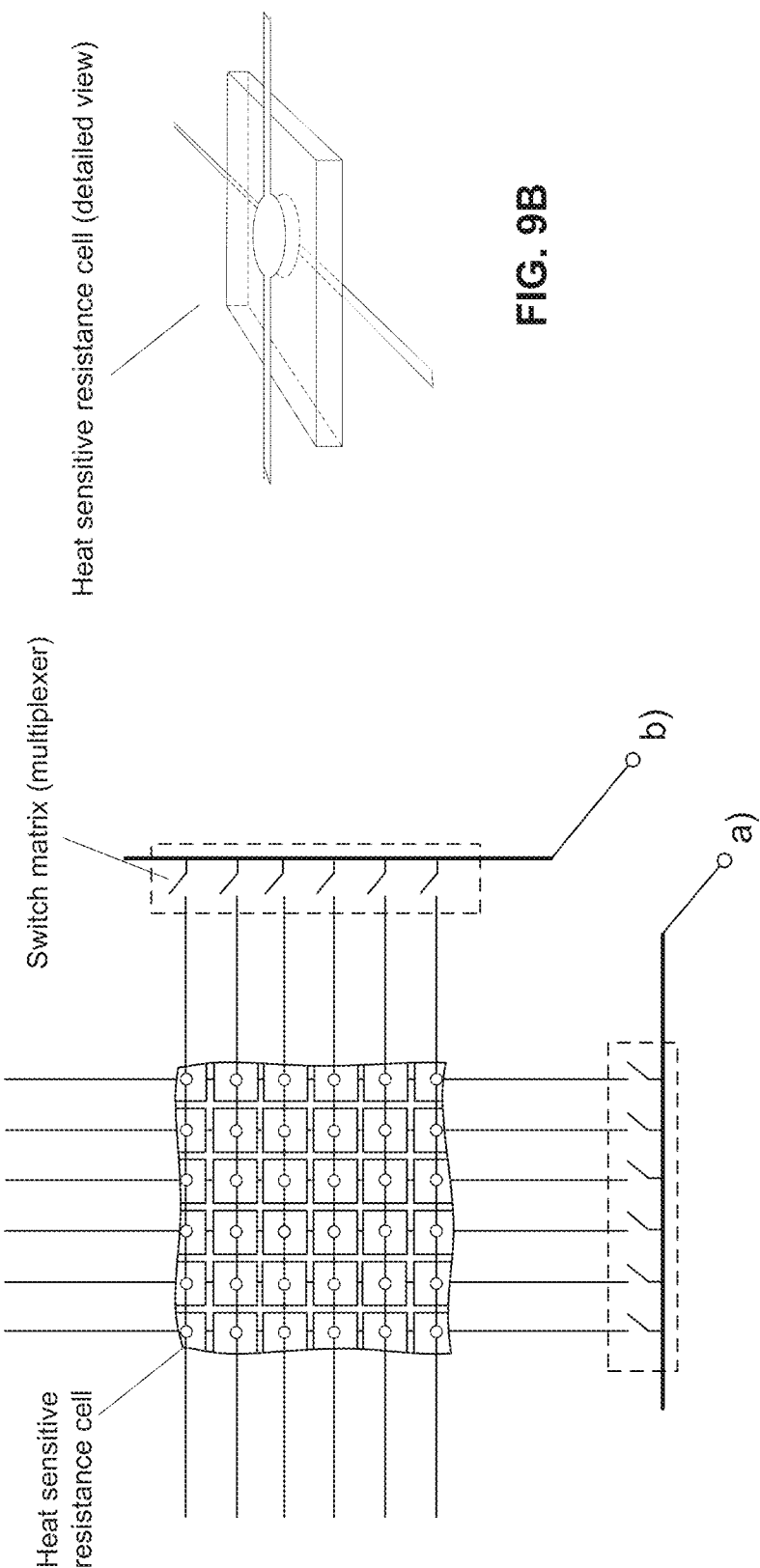
FIGS. 9A and 9B illustrate exemplary aspects of a selective heat sensitive array, in accordance with an illustrative aspect.

In some aspects, sensing a change of a resistance may also be performed on a more spatially selective basis using an array (matrix) of resistance cells connected to a switch matrix (multiplexer). FIGS. 9A and 9B illustrate exemplary aspects of a selective heat sensitive resistance array, in accordance with an illustrative aspect. FIG. 9B is a more detailed view of a heat sensitive resistance cell including a heat sensitive resistance material as previously described. As shown in FIG. 9A, a hot foreign object may be detected by sensing an electrical resistance between terminals a and b and by closing one switch pair at a time (e.g., according to a time multiplexing scheme) (e.g., as controlled by a controller, such as base controller 342). For instance, when the two switches corresponding to a cell are closed, resistance of the individual cell may be measured, such as described with respect to FIG. 5.

In some aspects (not shown), the array may comprise a small number of heat sensitive resistance cells (e.g. only 4×4), each cell covering a significant portion of the area to be monitored. In such aspects, each cell may be contacted by an electrode grid as illustrated in FIG. 7. Dividing the area of the heat sensitive resistance layer in portions may enhance the hot foreign object detection system in terms of sensitivity and reliability.

In certain aspects, a selective heat sensitive resistance array, may further be used to determine a location of a foreign object within an area of the heat sensitive resistance array. For example, as described, resistance of individual cells may be measured. Accordingly, if the resistance of a particular cell indicates presence of a foreign object, then the controller determines the foreign object is in the area where the particular cell is located. For example, the controller may have information about a position of each cell in the heat sensitive array and determine a position of the foreign object based on the position of the cell indicating presence of the foreign object.

In some further implementations (not shown), the heat sensitive resistance layer may be a single plate 762 as illustrated in FIG. 7, but with its connecting electrodes switched with a switched matrix as shown in FIG. 9A. This may be considered as a combination of the implementation of FIG. 7 with the implementation of FIG. 9A.

Figure 10:
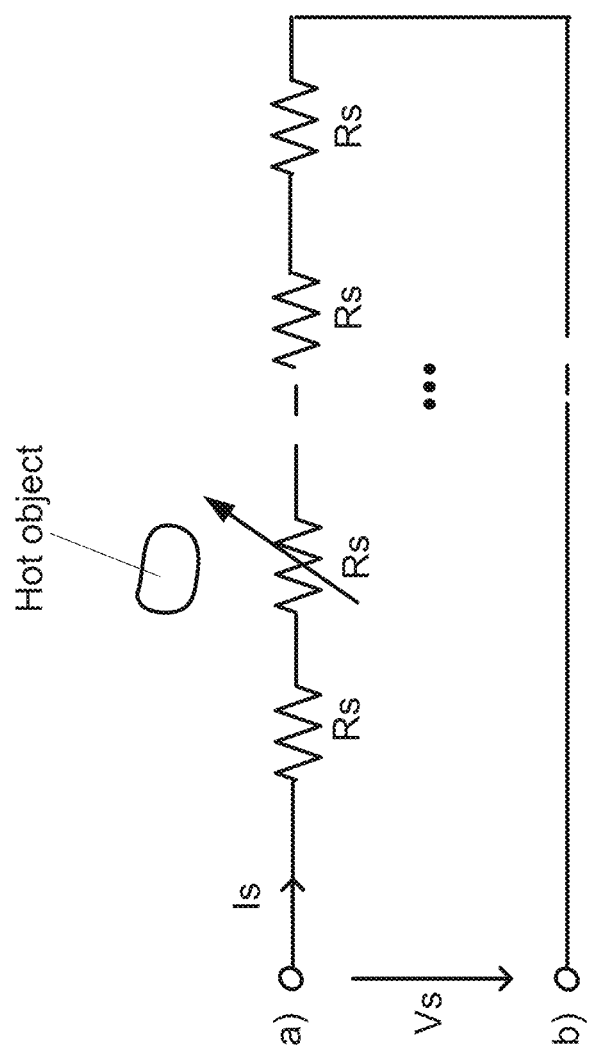
FIG. 10 illustrates an example of a circuit corresponding to a heat sensitive layer, in accordance with an illustrative aspect.

In some embodiments of heat sensitive resistance layer 500 of FIG. 5 (e.g., the cable shown), a suitable heat sensitive resistance material may be used for the conductive wires (e.g. 564) or, in some aspects, for one or both of conductive wires and the insulation (e.g. 562) of FIG. 5. In such aspects, conductive wires 564 may be preferably made of material with a PTC characteristic. A corresponding lumped element circuit model comprising a series of resistances Rs, connected in series, is illustrated in FIG. 10. In such aspects, a hot foreign object in proximity of one of resistances Rs may increase the resistance of conductive wires 564. In such aspects, the wire resistance may be measured at terminals a and b with a short circuit at the other end of the cable, as shown in FIG. 10. To minimize eddy current losses and interference of the resistance measurement, the separation between the at least two conductive wires of the heat sensitive resistance cable may be minimal and/or the conductive wires may be twisted.

In some embodiments of heat sensitive resistance layer 500 of FIG. 5, the material used for the conductive wires (e.g. 564) may be a material that becomes substantially non-conductive when a temperature exceeds a defined threshold so that a high resistance (e.g., substantially open) is measured between terminals a and b, provided that the wire ends are short circuited (not shown in FIG. 5).

In some aspects, a heat sensitive impedance material may be used in all the embodiments described in relation to FIGS. 4 through 10. Heat sensitive impedance material may be material that changes its impedance (e.g., resistance and/or capacitance, inductance) as temperature rises. In such aspects, the change in impedance may be sensed using an AC or a pulsed signal source in the measuring circuit.

In some implementations using an electromagnetic or acoustic waveguide with one or more temperature sensitive characteristics as previously described, the waveguide may be an optical fiber, a tube filled with a dielectric material or a gas. The heat sensitive waveguide may be disposed in a manner as previously described in connection with FIG. 5, e.g. in form of serpentines, meanders, spirals, etc. in a layer below the surface of the wireless power transfer pad. In some other implementations, the heat sensitive waveguide may have the shape of a plate (layer) 762 as previously described in connection with FIG. 7.

In some aspects, hot foreign object detection using a heat sensitive resistance layer, as described above, may be combined with additional discrete temperature sensors that may be integrated into the wireless power transfer pad. In some aspects, such sensors may provide indication of a general increase of the wireless power transfer pad's temperature (e.g. during active power transfer) and, therefore, improve reliability of hot foreign object detection. Such sensors may be coupled with a controller (e.g., controller 342) configured to control wireless power transfer of the wireless power transfer pad. For example, in certain aspects, if both the temperature sensors sense a temperature above a first threshold indicative of presence of a foreign object, and the measured characteristic of the heat sensitive material satisfies a threshold indicative of presence of a foreign object, the controller determines a foreign object is present and takes appropriate action. In certain aspects, if either the temperature sensors do not sense a temperature above the first threshold, or the measured characteristic of the heat sensitive material does not satisfy the threshold indicative of presence of a foreign object, the controller determines a foreign object is not present and takes appropriate action. In certain aspects, if either the temperature sensors sense a temperature above the first threshold, or the measured characteristic of the heat sensitive material does satisfy the threshold indicative of presence of a foreign object, the controller determines a foreign object is present and takes appropriate action. In certain aspects, if the temperature sensors sense a temperature above the first threshold, the controller only then measures the characteristic of the heat sensitive material and takes appropriate action based on whether the measured characteristic does or does not satisfy the threshold indicative of presence of a foreign object. In certain aspects, if the measured characteristic of the heat sensitive material does satisfy the threshold indicative of presence of a foreign object, only then the controller uses the temperature sensors to sense the temperature, and based on whether the sensed temperature is above or below the first threshold, takes appropriate action.

In some aspects, sensing a heat sensitive characteristics of a material may also allow determining a spatial profile or a spatial distribution of this heat sensitive characteristics over the area covered by the foreign object detection system using the controller. In some implementations, such a distribution is determined using a plurality of heat sensitive resistance cells as shown in FIG. 9A. In some other implementations, some spatial resolution of a heat sensitive characteristics may be provided using a cable with a heat sensitive resistance as previously described in connection with FIG. 5 e.g. by employing a time domain or frequency domain reflectometry method. In some further implementations based on acoustic or electromagnetic waveguides e.g. an optical fiber as previously described, a spatial profile is determined e.g. using a time domain or frequency domain reflectometry method.

In a further aspect, spatial resolution may be used for determining presence of a hot foreign object based on a space-differential detection approach. In some implementations employing a space-differential scheme, decision on presence of a hot object may be made based upon a ratio of a peak value to an average value of a sensed characteristic of a temperature sensitive material by the controller. For example, if the ratio satisfies a threshold (e.g., is above a threshold) the controller determines a foreign object is present and takes appropriate action. If the ratio does not satisfy the threshold, the controller determines a foreign object is not present and takes appropriate action. In some other implementations, a decision is made based upon a ratio of a peak value to a median value or another percentile of a discretized distribution of a sensed heat sensitive characteristic of a material. For example, in certain aspects the ambient temperature or temperature near the wireless power transfer pad may be high (e.g., on a hot day). Accordingly, in such aspects, if the ambient temperature is high enough to cause the sensed characteristic of a temperature sensitive material to be above a set threshold for detecting a foreign object, then the controller may determine a foreign object is present when it is not, leading to a false positive. However, if spatial resolution is used for determining presence of the foreign object, then even if the ambient temperature is high across the wireless power transfer pad (e.g., across cells of a heat sensitive array), the cells are less likely to have a peak value such that the ratio of the peak value to the average value across the cells is above a threshold unless a foreign object is present, thereby reducing the likelihood of a false positive. Further, even if the temperature sensitive material does not provide accurate measurements of temperature, it may provide precise measurements such that the ratio of peak value to average value does not vary as much from one implementation to another, thereby making relative measurements easier to use for control of the wireless power transfer pad.

In yet a further aspect, presence of a hot foreign object may be determined based on a time-differential approach and decision is made based on a level of temporal change (rate of change) of a sensed characteristic of a temperature sensitive material, e.g. by employing a differentiator or high pass filter upon successively sensed values. For example, in certain aspects, an object near a wireless power transfer pad may be hot, but not correlated to the output of the wireless power transfer pad. For example, an object near the wireless power transfer pad may stay at a steady temperature regardless of whether the wireless power transfer pad is transferring power or not. Further, in certain aspects, the ambient temperature near the wireless power transfer pad may be generally high, but not changing. Accordingly, utilizing the rate of change of a sensed characteristic can be used to determine a rate of change in temperature. If temperature is not changing by a threshold, then there may not be a foreign object, and rather the general temperature near the wireless power transfer pad may be hot. However, if the temperature is changing by a threshold, it may indicate the object will heat up further, and may be a foreign object. Some implementations may employ both space and time-differential detection.

In some aspects, the electrode grid structure used for heat sensitive resistance sensing, as shown in FIGS. 7 and 8, may also be used for capacitively sensing objects (e.g. living objects) located near the surface of a wireless power transfer pad. The various detection methods may be employed by a measuring circuit and/or controller, as discussed.

In some aspects, sense coils of an inductive sensing foreign object detection system (e.g., inductive foreign object detector) may be used as additional temperature sensors (e.g., by measuring the impedance, and particularly the resistance of the sense coils) along with a heat sensitive material based detection. For example, such an inductive foreign object detector may correspond to the previously described additional discrete temperature sensors.

Figure 11:
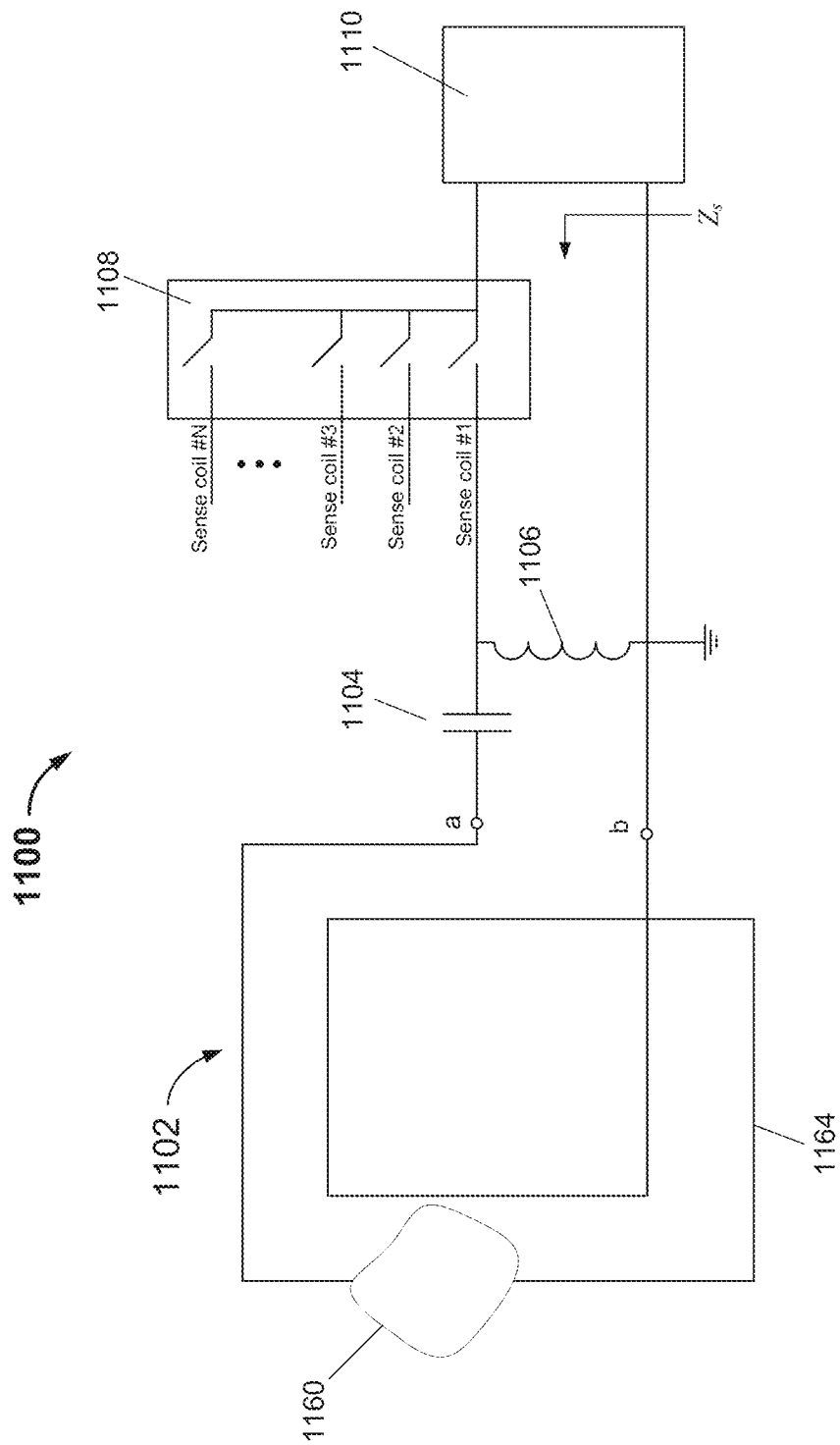
FIG. 11 is a circuit diagram illustrating an example of an inductive foreign object detector, in accordance with an illustrative aspect.

An exemplary inductive foreign object detector is illustrated in FIG. 11. The inductive foreign object detector 1100 may use a plurality of inductive sense coils 1102 operationally connected via series capacitor 1104 and multiplexer 1108 to a detection circuit 1110 (e.g., a measuring circuit, a controller (e.g., base controller 342), etc.). Though only a single inductive sense coil 1102 is shown in FIG. 11, in certain aspects, a plurality of inductive sense coils 1102 may be used for inductive foreign object detection. Though illustrated as a "circular" coil, sense coils 1102 may be "double-D" coils or other conductive wire structures. The plurality of sense coils 1102 may be an array of substantially coplanar coils arranged in rows and columns (not shown). In certain aspects, the plurality of sense coils 1102 are disposed on top of a wireless power transfer pad. In certain aspects, the plurality of sense coils 1102 may be positioned similar to a heat sensitive material such as described with respect to FIGS. 4A-4D. In certain aspects, the plurality of sense coils 1102 may be included along with the heat sensitive material and either in the same position (e.g., substantially same plane) or different position (e.g., above or below) as the heat sensitive material. For example, in certain aspects, the plurality of sense coils 1102 are positioned (e.g., closely) below the upper surface (e.g., cover shell, such as any of cover shell 405A-405D) of an enclosure (e.g., any of enclosure 400A-400D) facing towards a wireless power receiver. In certain aspects, the detection circuit 1110 is configured to measure an electrical characteristic of each of the plurality of sense coils 1102 in a time-multiplexed fashion. The characteristic may include at least one of an impedance, a resistance, an induced voltage, or an impulse response. In certain aspects, the detection circuit 1110 applies a sense current having a frequency to the n-th sense coil 1102 as selected by the multiplexer 1108 e.g. for measuring an impedance $Z_{s,n}$ at the measuring port as indicated in FIG. 11 by $Z_s$. A change in the impedance $Z_{s,n}$ relative to a reference value (e.g., by a threshold) may indicate presence of a foreign object 1160. In certain aspects, the sense frequency is considerably above the frequency used for wireless power transfer (e.g., operating frequency of base coupler 204), e.g. in the MHz range. Series capacitor 1104 and shunt inductor 1106 may act as a high pass filter attenuating the voltage induced into the sense coil 1102 by a strong low frequency electromagnetic field (<150 kHz) used for wireless power transfer. In some implementations, series capacitor 1104 and the inductance of the sense coil 1102 are configured to form a resonance at the sense frequency. Measuring the impedance at or near resonance may be advantageous in some implementations.

In further aspects, inductive foreign object detection is based on measuring a voltage induced into a sense coil 1102 by the magnetic field as generated by another coil different from the sense coil (e.g. the coil of the base coupler 304 with reference to FIG. 3). In some implementations, the magnetic field is the magnetic field as used for wireless power transfer, and capacitor 1104 and shunt inductor 1106 are omitted and there is virtually no current flowing in the sense coil 1102 for the purpose of inductive sensing.

In some aspects, the circuit illustrated in FIG. 11 may combine inductive sensing and heat sensing by using sense coils that are made of a heat sensitive conductor material 1164 (e.g., a heat sensitive material as discussed herein, such as with respect to wires 564 and insulation 562) that changes its resistance (e.g. or other electrical characteristic as described) (e.g., substantially) when temperature exceeds a threshold (e.g., critical level). In certain aspects, a foreign object 1160 which may not be detected by inductive sensing (e.g., too small in size and/or due to positioning or orientation with respect to the sense coil 1102) may be detected by its thermal effect, e.g., by sensing a change in a resistance of the heat sensitive conductor material 1164 of heat sensitive sense coil 1102.

Figures 12A, 12B, 12C:
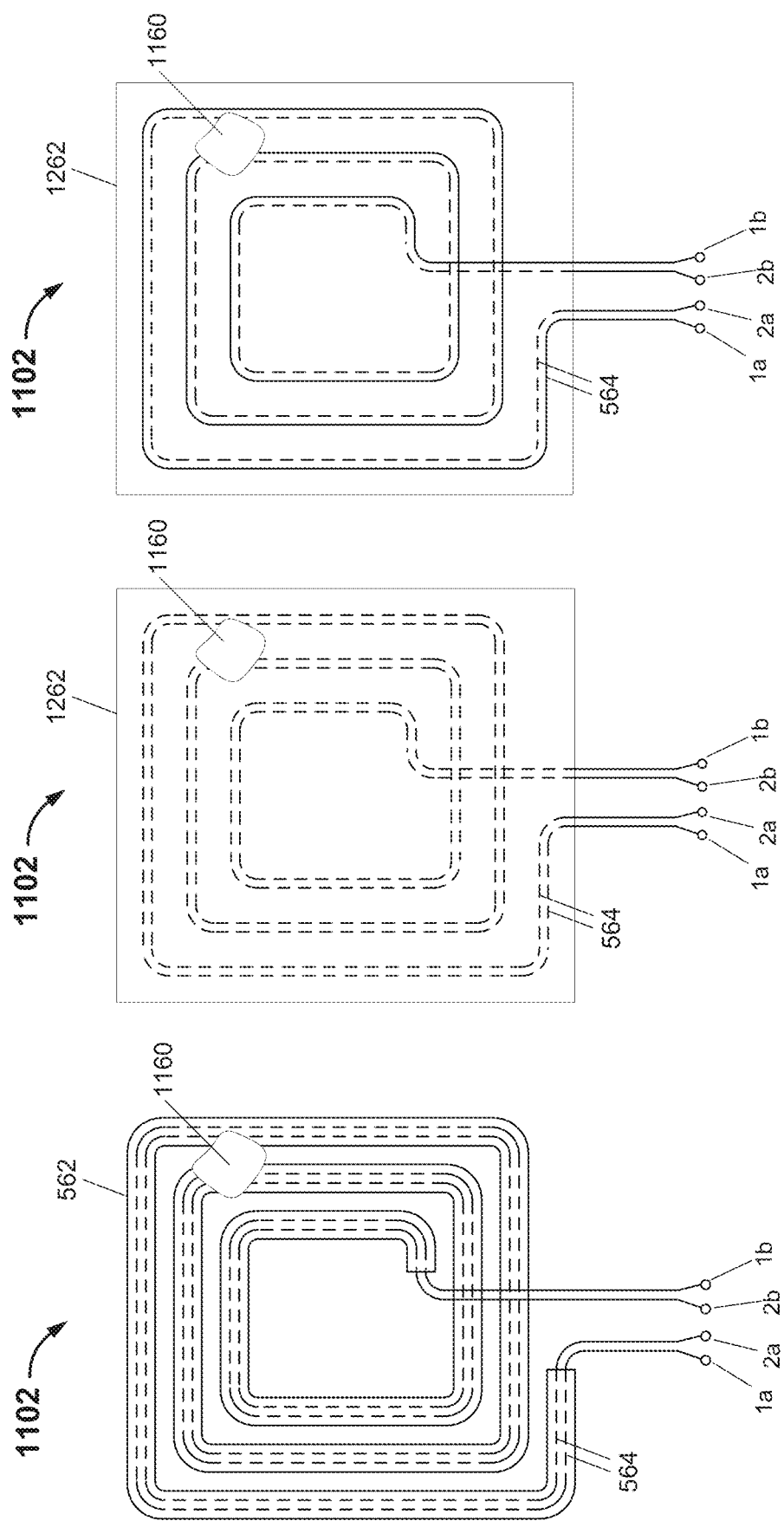
FIG. 12A illustrates an example of a bifilar inductive sense coil using a heat sensitive material, in accordance with an illustrative aspect.
FIG. 12B illustrates an example of a bifilar inductive sense coil embedded in a heat sensitive layer, in accordance with an illustrative aspect.
FIG. 12C illustrates another example of a bifilar inductive sense coil with a heat sensitive layer between the two coil windings, in accordance with an illustrative aspect.

In further aspects, one or more of the plurality of sense coils 1102 may be bifilar (e.g., including two separate wires (e.g., approximately in parallel and closely spaced)) winding structures as illustrated in FIGS. 12A to 12C for example. For example, in certain aspects, sense coil 1102 comprises separate windings that are electrically insulated from each other using a heat sensitive material (e.g., heat sensitive resistance material) that changes its insulation resistance based on temperature (e.g., locally in presence of a hot object 1160 laying on the surface of a wireless power transfer pad as previously described in connection with FIG. 5). For example, the windings may comprise conductive wires 564 as shown. Further, in certain aspects, the heat sensitive material insulating conductive wires 564 from each other comprises heat sensitive insulation 562 (e.g., a cable insulation 562 around the conductive wires 564 as illustrated in FIG. 12A). Alternatively, the bifilar wire structure comprising conductive wires 564 may be embedded in a heat sensitive resistance layer 1262 e.g. as previously described in connection with FIGS. 4A to 4D. In some implementations (not shown), the bifilar winding structure (e.g., conductive wires 564) may be a twisted pair. In some implementations, a first sense coil winding (e.g., first conductive wire 564) and a second sense coil winding (e.g., second conductive wire 564) are disposed in the same plane e.g. embedded in a heat sensitive resistance layer 1262 as illustrated in FIG. 12B. In further implementations, a first sense coil winding (e.g., first conductive wire 564) and a second sense coil winding (e.g., second conductive wire 564) are disposed in different planes and the heat sensitive resistance layer 1262 is between the two planes. As illustrated in FIG. 12C, a first sense coil winding (non-dashed line) (e.g., first conductive wire 564) may contact a top surface of a heat sensitive resistance layer 1262 while a second sense coil winding (e.g., second conductive wire 564) (dashed-line) may contact a bottom surface of the heat sensitive resistance layer 1262. In yet a further aspect, at least one of the conductive wires 564 of the bifilar sense coil 1102 is made of a heat sensitive material that changes its resistance (or another electrical characteristic) (e.g., substantially) when a temperature of the heat sensitive material exceeds a threshold (e.g., critical level), e.g., as previously described in connection with FIG. 10.

Figure 13A:
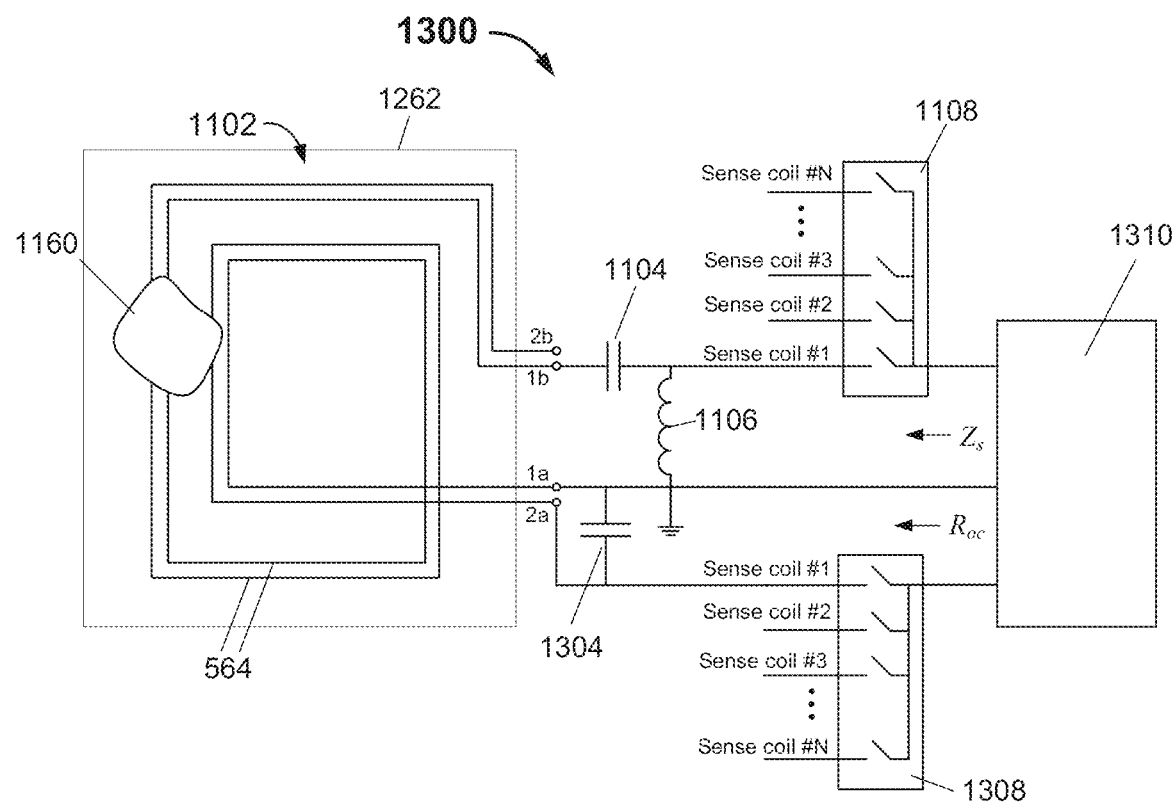
FIG. 13A is a circuit diagram illustrating an example of a foreign object detector combining inductive sensing and heat sensing, in accordance with an illustrative aspect.

In some aspects, FIG. 13A illustrates an exemplary combined inductive and heat sensing foreign object detector 1300 using a plurality of bifilar sense coils 1102 (e.g., as described with respect to any of FIGS. 12A to 12C) in accordance with certain aspects. Terminals 1a and 1b of a first sense coil winding comprising a conductive wire 564 of sense coil 1102 may be operationally connected via series capacitor 1104 and a first multiplexer 1108 to an impedance measuring port $Z_s$ of detection circuit 1310 (e.g., a measuring circuit, a controller (e.g., base controller 342), detection circuit 1110, etc.). Terminals 1a and 2a of the first sense coil windings and a second sense coil winding comprising a conductive wire 564 of sense coil 1102, respectively, may be operationally connected via a second multiplexer 1308 to an insulation resistance measurement port denoted by $R_{oc}$ of detection circuit 1310, while terminal 2b of the second sense coil winding may be open circuited. In certain aspects, the first and second sense coil windings are insulated from each other by a heat sensitive material such as a heat sensitive insulation 562 (not shown) or a heat sensitive resistance layer 1262 (as shown). Both measurement ports may have a common ground as indicated in FIG. 13A. In some implementations, the detection circuit 1310 is configured to measure the (e.g., DC insulation (e.g., open circuit)) resistance between the first sense coil winding and the second sense coil winding. A change in the open circuit resistance $R_{oc}$ relative to a reference value (e.g., a threshold) may be indicative of the presence of a foreign object 1160. Capacitor 1304 may be configured to serve as low pass filter to reject potential frequency components induced by the electromagnetic field used for wireless power transfer and/or by a high frequency sense field from the sense coil 1102 as used for inductive sensing.

In certain aspects, for each sense coil 1102, to perform inductive sensing, the first multiplexer 1108 couples terminals 1a and 1b of the first sense coil winding to the impedance measuring port $Z_s$ of detection circuit 1310. The detection circuit 1310 measures impedance at the impedance measurement port and determines if a foreign object is present based on the measured impedance (e.g., as described with respect to FIG. 11).

In certain aspects, for each sense coil 1102, to perform heat sensing, the second multiplexer 1308 couples terminals 1a and 2a of the first sense coil winding and the second sense coil winding to the insulation resistance measurement port denoted by $R_{oc}$ of detection circuit 1310. The detection circuit 1310 measures resistance at the resistance measurement port and determines if a foreign object is present based on the measured resistance (e.g., as described with respect to FIG. 12).

Figure 13B:
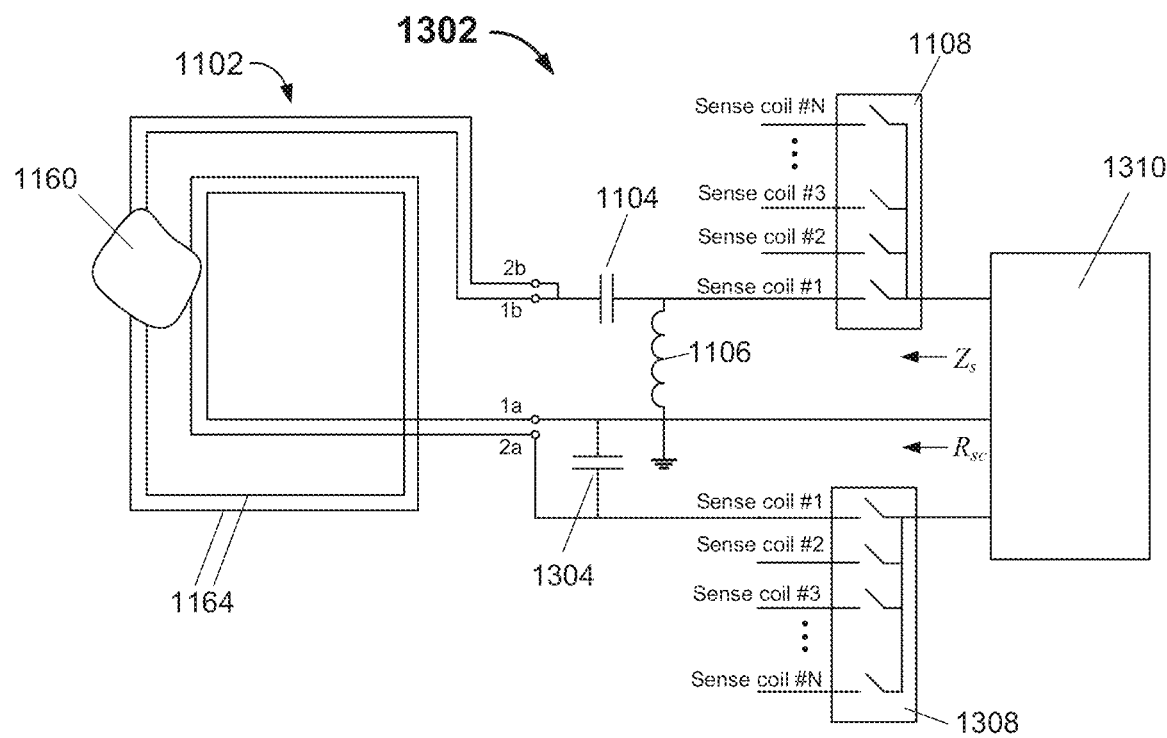
FIG. 13B is a circuit diagram illustrating another example of a foreign object detector combining inductive sensing and heat sensing, in accordance with an illustrative aspect.

FIG. 13B illustrates another exemplary implementation of a combined inductive and heat sensing foreign object detector 1302 including a plurality of bifilar sense coils 1102 made of a heat sensitive conductor material 1164. In certain aspects, unlike detector 1300, in detector 1302, terminals 1b and 2b of the first sense coil winding and the second sense coil winding, respectively, are short circuited, and at least one of the first sense coil winding and the second sense coil winding comprises heat sensitive conductor material 1164. Further, in certain aspects, in detector 1302, detection circuit 1310 is configured to measure the resistance of the conductive structure (e.g., windings comprising heat sensitive conductor material 1164) of sense coil 1102. In some aspects, the detection circuit 1310 measures the short circuit DC resistance $R_{sc}$. A change in the short circuit DC resistance $R_{sc}$ relative to a reference value (e.g., a threshold) may be indicative of the presence of a foreign object 1160. In certain aspects, heat detection based on a DC resistance measurement $R_{sc}$ as illustrated in FIG. 13B may be more sensitive and reliable than measuring the impedance $Z_s$ (e.g. at high frequency) as illustrated in FIG. 11.

The implementations as illustrated in FIGS. 11, 12, and 13 should be construed as exemplary and non-limiting. They do not represent the only implementations of a combined inductive and heat sensing foreign object detector. For example, in certain aspects, a combined inductive and heat sensing foreign object detector may include a separate inductive foreign object detector (e.g., foreign object detector 1100) and a separate heat sensing foreign object detector (e.g., as described with respect to FIGS. 4-10. In certain aspects, whether separate or integrated (e.g., as discussed with respect to FIG. 13), the detection parameters (e.g., resistance, capacitance, etc.) from the heat sensing detection and the detection parameters (e.g., impedance, a resistance, an induced voltage, or an impulse response) from the inductive sensing detection may be combined to control wireless power transfer.

For example, each of the heat sensing detection system and the inductive sensing detection system may be coupled to a controller (e.g., controller 342, detection circuit, etc.) configured to control wireless power transfer of a wireless power transfer pad. For example, in certain aspects, if both the inductive sensing detection system senses an electrical characteristic that satisfies a threshold (e.g., first threshold) indicative of presence of a foreign object, and the heat sensing detection system senses an electrical characteristic that satisfies a threshold (e.g., second threshold) indicative of presence of a foreign object, the controller determines a foreign object is present and takes appropriate action.

In certain aspects, if either the inductive sensing detection system senses an electrical characteristic that does not satisfy the threshold indicative of presence of a foreign object, or the heat sensing detection system senses an electrical characteristic that does not satisfy the threshold indicative of presence of a foreign object, the controller determines a foreign object is not present and takes appropriate action. In certain aspects, if either the inductive sensing detection system senses an electrical characteristic that satisfies the threshold indicative of presence of a foreign object, or the heat sensing detection system senses an electrical characteristic that satisfies the threshold indicative of presence of a foreign object, the controller determines a foreign object is present and takes appropriate action. In certain aspects, if the heat sensing detection system senses an electrical characteristic that satisfies the threshold indicative of presence of a foreign object, the controller only then directs the inductive sensing detection system to measure the electrical characteristic and takes appropriate action based on whether the measured electrical characteristic does or does not satisfy the threshold indicative of presence of a foreign object. In certain aspects, if the inductive sensing detection system senses an electrical characteristic that satisfies the threshold indicative of presence of a foreign object, the controller only then directs the heat sensing detection system to measure the electrical characteristic and takes appropriate action based on whether the measured electrical characteristic does or does not satisfy the threshold indicative of presence of a foreign object. In certain aspects, the results of one of the inductive sensing system and the heat sensing system is used to control the other of the inductive sensing system and the heat sensing system.

In some aspects, once the presence of a hot foreign object is detected (as described above in relation to FIGS. 5-13), the wireless charging system may take one or more actions. For instance, the system may go into a low power mode, reduce power, turn off, or issue alerts prompting a user to remove the object. Further, in some aspects, the detection of a hot foreign object may be made more reliable by correlating the sensed change of a characteristics of a temperature sensitive material or inductive sensing, as described above in relation to FIGS. 5-13, with a level of the alternating magnetic field as generated by the wireless power transfer pad. The generated alternating magnetic field may relate to the transfer of power between the wireless power transfer device and the wireless power receiver. For instance, a change in an electrical characteristic (e.g., resistance) when power is being transmitted, may illustrate a higher chance of the change in resistance being due to the presence of a hot foreign object and vice versa.

In some other aspects, the detection of a hot foreign object may be made more reliable by correlating the sensed change of a characteristics of a temperature sensitive material or inductive sensing, as described above in relation to FIGS. 5-13, with an output of another foreign object detector e.g., based on microwave radar sensing, infrared sensing e.g. using a vehicle underbody mounted camera, etc.

Figure 14:
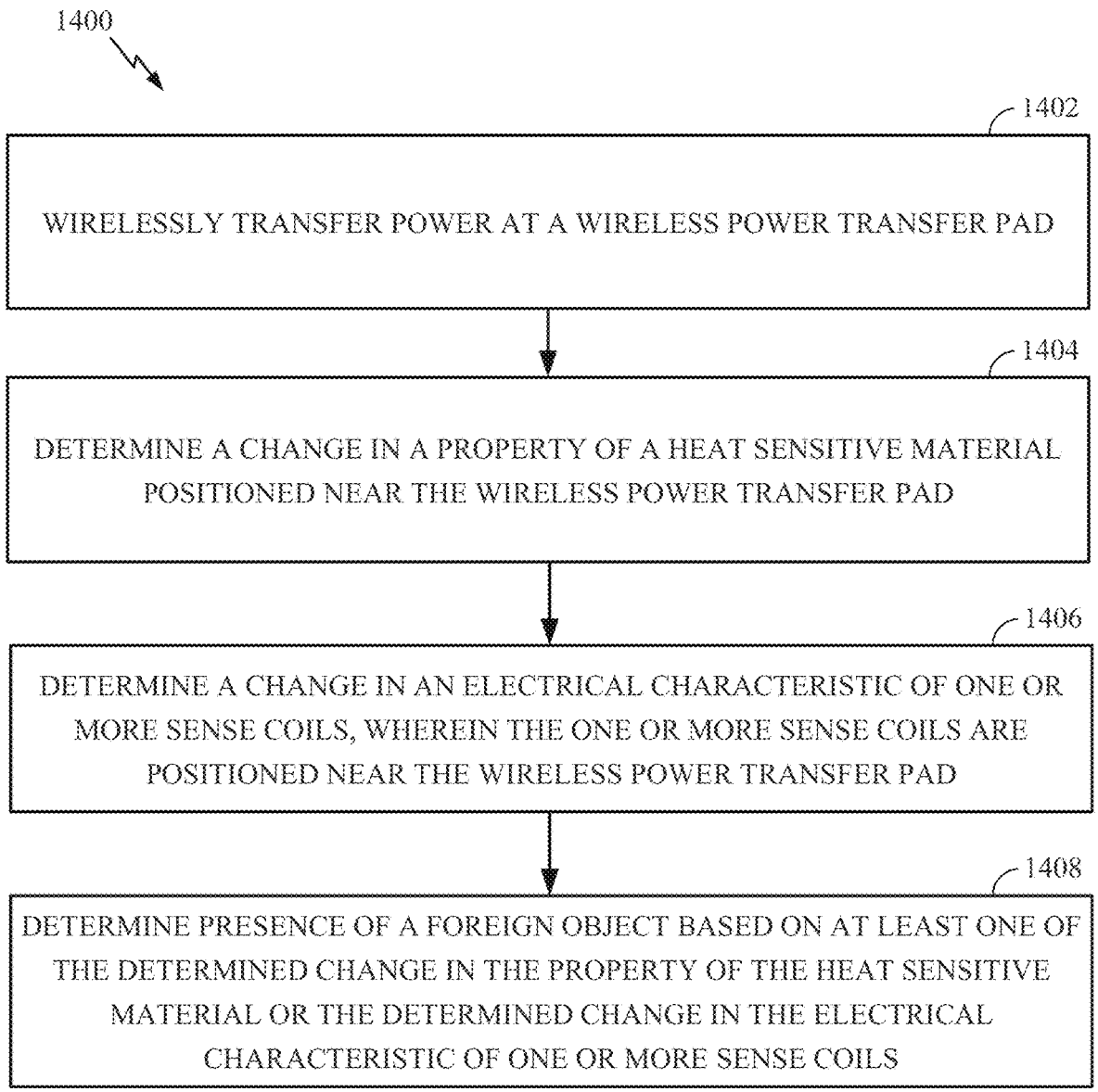
FIG. 14 illustrates example operations for performing combined inductive sensing and heat sensing for foreign object detection, in accordance with an illustrative aspect.

FIG. 14 illustrates example operations for performing combined inductive sensing and heat sensing for foreign object detection, in accordance with an illustrative aspect. In certain aspects, the operations 1400 may be performed by a controller.

Operations 1400 begin at optional 1402 where power is wirelessly transferred at a wireless power transfer pad. At 1404, a change in a property of a heat sensitive material positioned near the wireless power transfer pad is determined. At 1406, a change in an electrical characteristic of one or more sense coils is determined, wherein the one or more sense coils are positioned near the wireless power transfer pad. At 1408, presence of a foreign object is detected (and optionally wirelessly transferring the power is adjusted or an alert is generated) based on at least one of the determined change in the property of the heat sensitive material or the determined change in the electrical characteristic of one or more sense coils.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for detecting a presence of a foreign object in an inductive wireless power transfer system, the apparatus comprising:
   a sensing system comprising:
      one or more sense coils, at least a portion of the one or more sense coils configured to inductively sense the foreign object via a magnetic field; and
      a heat sensitive material having a property that changes as a function of temperature, the heat sensitive material configured to change an electrical characteristic of at least a portion of the one or more sense coils as a function of the property; and
   a controller coupled to the sensing system, the controller configured to measure the electrical characteristic of the one or more sense coils and determine a presence of the foreign object based on a change of the measured electrical characteristic.

2. The apparatus of claim 1, wherein the property of the heat sensitive material comprises one or more of a resistivity, a conductivity, an impedance, an insulation resistance, and a capacitance.

3. The apparatus of claim 1, wherein the heat sensitive material is configured to substantially change the property as the temperature passes a threshold that is higher than 370 Kelvin.

4. The apparatus of claim 3, wherein the heat sensitive material includes a doped polymer.

5. The apparatus of claim 1, wherein at least one sense coil comprises one or more turns of an electrical conductor.

6. The apparatus of claim 5, wherein the one or more sense coils are implemented as a printed wire board.

7. The apparatus of claim 1, wherein at least one sense coil comprises the heat sensitive material.

8. The apparatus of claim 1, wherein the one or more sense coils are embedded in a layer also comprising the heat sensitive material.

9. The apparatus of claim 1, wherein the heat sensitive material is included in a first layer that is different than a second layer comprising the one or more sense coils.

10. The apparatus of claim 1, wherein the electrical characteristic measured by the controller comprises one or more of an impedance, a resistance, a direct current (DC) resistance, an induced voltage, and an impulse response.

11. The apparatus of claim 1, wherein the controller determines the presence of the foreign object by correlating the measured electrical characteristic with a level of an alternating magnetic field generated by the inductive wireless power transfer system.

12. The apparatus of claim 1, wherein the controller determines the presence of the foreign object by correlating the measured electrical characteristic with an output of another foreign object detection system.

13. The apparatus of claim 12, wherein the other foreign object detection system is based on a microwave radar sensing technique or an infrared sensing technique.

14. The apparatus of claim 1 further comprising a heat resistant material configured to protect the sensing system against damage from heat from the foreign object.

15. The apparatus of claim 14, wherein the heat resistant material constitutes at least a portion of an enclosure of the wireless power transfer system.

16. The apparatus of claim 14, wherein the heat resistant material has a melting point higher than 470 Kelvin and is configured to withstand a temperature reached by the foreign object higher than 470 Kelvin.

17. The apparatus of claim 14, wherein the heat resistant material comprises one or more of a nylon resin, a perfluoroelastomer, a polymerized siloxane, a glass reinforced plastic, a carbon-fiber reinforced plastic, a structural composite, a sintered high temperature polymer, or a ceramic matrix composite.

18. An apparatus for detecting a presence of a foreign object in an inductive wireless power transfer system comprising:
   a sensing system comprising:
      one or more sense coils configured to inductively sense the foreign object via a magnetic field; and
      a heat resistant material configured to protect the sensing system against damage from heat from the foreign object; and
   a controller coupled to the sensing system, the controller configured to measure an electrical characteristic of the one or more sense coils and determine a presence of the foreign object based on a change of the measured electrical characteristic.

19. The apparatus of claim 18, wherein the heat resistant material constitutes at least a portion of an enclosure of the wireless power transfer system.

20. The apparatus of claim 18, wherein the heat resistant material has a melting point higher than 470 Kelvin and is configured to withstand a temperature reached by the foreign object higher than 470 Kelvin.

21. The apparatus of claim 18, wherein the heat resistant material comprises one or more of a nylon resin, a perfluoroelastomer, a polymerized siloxane, a glass reinforced plastic, a carbon-fiber reinforced plastic, a structural composite, a sintered high temperature polymer, and a ceramic matrix composite.

22. The apparatus of claim 18, wherein the electrical characteristic measured by the controller comprises one or more of an impedance, a resistance, an induced voltage, and an impulse response.

23. The apparatus of claim 18, wherein the controller determines the presence of the foreign object by correlating the measured electrical characteristic with a level of an alternating magnetic field generated by the inductive wireless power transfer system.

24. The apparatus of claim 18, wherein the controller determines the presence of the foreign object by correlating the measured electrical characteristic with an output of another foreign object detection system.

* * * * *